(12) United States Patent
Yang et al.

(10) Patent No.: US 9,065,621 B2
(45) Date of Patent: *Jun. 23, 2015

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/371,958

(22) PCT Filed: Jan. 15, 2013

(86) PCT No.: PCT/KR2013/000308
§ 371 (c)(1),
(2) Date: Jul. 11, 2014

(87) PCT Pub. No.: WO2013/105837
PCT Pub. Date: Jul. 18, 2013

(65) Prior Publication Data
US 2015/0036603 A1 Feb. 5, 2015

Related U.S. Application Data

(60) Provisional application No. 61/586,827, filed on Jan. 15, 2012, provisional application No. 61/591,275, (Continued)

(30) Foreign Application Priority Data

Jan. 15, 2013 (KR) .......................... 10-2013-0004625

(51) Int. Cl.
*H04W 72/04* (2009.01)
*H04L 5/00* (2006.01)
*H04L 1/16* (2006.01)

(52) U.S. Cl.
CPC .............. *H04L 5/0055* (2013.01); *H04L 5/001* (2013.01); *H04L 1/1607* (2013.01); *H04W 72/042* (2013.01)

(58) Field of Classification Search
CPC ... H04W 72/042; H04L 5/001; H04L 1/1861; H04L 5/0055
See application file for complete search history.

(56) References Cited

FOREIGN PATENT DOCUMENTS

KR 10-2010-0080483 7/2010
KR 10-2011-0069735 6/2011
(Continued)

OTHER PUBLICATIONS

3GPP TS 36.213 v11.0.0 (Sep. 2012), 3rd Generation Partnership Project; Technical Specification Group Radio Access Network; Evolved Universal Terrestrial Radio Access (E-UTRA); Physical layer procedures (Release 11), Sep. 2012, 143 pages.*

*Primary Examiner* — Hoon J Chung
(74) *Attorney, Agent, or Firm* — Lee, Hong, Degerman, Kang & Waimey

(57) ABSTRACT

The present invention relates to a wireless communication system, particularly, a method in which a terminal transmits control information in a CA-based wireless communication system and an apparatus for the method, the method comprising: configuring a first cell and a second cell having different subframe configurations, wherein the second cell has any one of UL-DL configuration #0 to #6; receiving a DC) format including a DAI field, for the second cell; and transmitting HARQ-ACK information relating to the downlink DCI format. For HARQ-ACK timing, in cases where a reference UL-DL configuration applied to the second cell is any one of UL-DL configurations #1 to #6, the DAI field is used in a process of transmitting the HARQ-ACK information. For HARQ-ACK timing, in cases where a reference UL-DL configuration applied to the second cell is #0, the DAI field is not used in a process of transmitting the HARQ-ACK information.

12 Claims, 14 Drawing Sheets

Related U.S. Application Data filed on Jan. 27, 2012, provisional application No. 61/596,206, filed on Feb. 7, 2012, provisional application No. 61/678,594, filed on Aug. 1, 2012, provisional application No. 61/693,339, filed on Aug. 27, 2012, provisional application No. 61/721,510, filed on Nov. 2, 2012, provisional application No. 61/722,136, filed on Nov. 3, 2012.

(56) References Cited

FOREIGN PATENT DOCUMENTS

| WO | 2010/145373 | 12/2010 |
| WO | 2011/049354 | 4/2011 |
| WO | 2011/066806 | 6/2011 |

* cited by examiner

PUCCH format 1a and 1b structure (normal CP case)

PHICH/UL grant-PUSCH timing (UL-DL configuration #1)

FIG. 18

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/000308, filed on Jan. 15, 2013, which claims the benefit of earlier filing date and right of priority to Korean Application No. 10-2013-0004625, filed on Jan. 15, 2013, and also claims the benefit of U.S. Provisional Application Serial Nos. 61/586,827, filed on Jan. 15, 2012, 61/591,275, filed on Jan. 27, 2012, 61/596,206, filed on Feb. 7, 2012, 61/678,594, filed on Aug. 1, 2012, 61/693,339, filed on Aug. 27, 2012, 61/721, 510, filed on Nov. 2, 2012 and 61/722,136, filed on Nov. 3, 2012, the contents of which are all incorporated by reference herein in their entirety.

TECHNICAL FIELD

The present invention relates to a wireless communication system and, more particularly, to a method and apparatus for transmitting control information in a carrier aggregation (CA)-based wireless communication system.

BACKGROUND ART

Wireless communication systems have been widely deployed to provide various types of communication services such as voice or data services. In general, a wireless communication system is a multiple access system capable of supporting communication with multiple users by sharing available system resources (bandwidth, transmit power, etc.). Multiple access systems include, for example, a code division multiple access (CDMA) system, frequency division multiple access (FDMA) system, time division multiple access (TDMA) system, orthogonal frequency division multiple access (OFDMA) system, and single-carrier frequency division multiple access (SC-FDMA) system.

DISCLOSURE

Technical Problem

An object of the present invention devised to solve the problem lies in a method and apparatus for transmitting control information in a carrier aggregation (CA)-based wireless communication system. Another object of the present invention devised to solve the problem lies in a method and apparatus for efficiently transmitting and receiving acknowledgement information on a downlink/uplink (DL/UL) signal.

It is to be understood that both the foregoing general description and the following detailed description of the present invention are exemplary and explanatory and are intended to provide further explanation of the invention as claimed.

Technical Solution

The object of the present invention can be achieved by providing a method for transmitting control information by a user equipment (UE) in a carrier aggregation (CA)-based wireless communication system, the method including configuring a first cell and a second cell having different subframe configurations, wherein the second cell is set to one of uplink-downlink (UL-DL) configurations #0 to #6, receiving a DL downlink control information (DCI) format including a downlink assignment index (DAI) field, for the second cell, and transmitting hybrid automatic repeat request (HARQ)-acknowledgement (ACK) information related to the DL DCI format, wherein, for HARQ-ACK timing, if a reference UL-DL configuration applied to the second cell is one of UL-DL configurations #1 to #6, the DAI field is used in a procedure for transmitting the HARQ-ACK information, wherein, for HARQ-ACK timing, if a reference UL-DL configuration applied to the second cell is UL-DL configuration #0, the DAI field is not used in a procedure for transmitting the HARQ-ACK information, and wherein subframe configurations according to the UL-DL configurations are given as shown in the following table.

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the above table, D denotes a DL subframe, U denotes a UL subframe, and S denotes a special subframe.

In another aspect of the present invention, provided herein is a user equipment (UE) used in a carrier aggregation (CA)-based wireless communication system, the UE including a radio frequency (RF) unit, and a processor, wherein the processor configures a first cell and a second cell having different subframe configurations, wherein the second cell is set to one of uplink-downlink (UL-DL) configurations #0 to #6, receives a DL downlink control information (DCI) format including a downlink assignment index (DAI) field, for the second cell, and transmits hybrid automatic repeat request (HARQ)-acknowledgement (ACK) information related to the DL DCI format, wherein, for HARQ-ACK timing, if a reference UL-DL configuration applied to the second cell is one of UL-DL configurations #1 to #6, the DAI field is used in a procedure for transmitting the HARQ-ACK information, wherein, for HARQ-ACK timing, if a reference UL-DL configuration applied to the second cell is UL-DL configuration #0, the DAI field is not used in a procedure for transmitting the HARQ-ACK information, and wherein subframe configurations according to the UL-DL configurations are given as shown in the following table.

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the above table, D denotes a DL subframe, U denotes a UL subframe, and S denotes a special subframe.

The first cell may be set to UL-DL configuration #0, and the second cell may be set to one of UL-DL configurations #1 to #6.

The first cell may be a primary cell (PCell), and the second cell may be a secondary cell (SCell).

The DL DCI format may further include a carrier indicator field (CIF).

The DL DCI format may include DCI format 1, 1A, 1B, 1C, 1D, 2, 2A, 2B, 2C, or 2D.

The HARQ-ACK information may include at least one of acknowledgement information about a physical downlink shared channel (PDSCH) signal indicated by the DL DCI format, and acknowledgement information about a physical downlink control channel (PDCCH) signal including the DL DCI format and indicating semi-persistent scheduling (SPS) release.

In another aspect of the present invention, provided herein is a method for transmitting control information by a user equipment (UE) in a carrier aggregation (CA)-based wireless communication system, the method including configuring a first cell and a second cell having different subframe configurations, wherein the second cell is set to one of uplink-downlink (UL-DL) configurations #1 to #6, receiving a DL downlink control information (DCI) format including a downlink assignment index (DAI) field, for the second cell, and transmitting hybrid automatic repeat request (HARQ)-acknowledgement (ACK) information related to the DL DCI format, wherein, for HARQ-ACK timing, if a reference UL-DL configuration applied to the second cell is UL-DL configuration #0, the DAI field is not used in a procedure for transmitting the HARQ-ACK information, and wherein subframe configurations according to the UL-DL configurations are given as shown in the following table.

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the above table, D denotes a DL subframe, U denotes a UL subframe, and S denotes a special subframe.

In another aspect of the present invention, provided herein is a user equipment (UE) used in a carrier aggregation (CA)-based wireless communication system, the UE including a radio frequency (RF) unit, and a processor, wherein the processor configures a first cell and a second cell having different subframe configurations, wherein the second cell is set to one of uplink-downlink (UL-DL) configurations #1 to #6, receives a DL downlink control information (DCI) format including a downlink assignment index (DAI) field, for the second cell, and transmits hybrid automatic repeat request (HARQ)-acknowledgement (ACK) information related to the DL DCI format, wherein, for HARQ-ACK timing, if a reference UL-DL configuration applied to the second cell is UL-DL configuration #0, the DAI field is not used in a procedure for transmitting the HARQ-ACK information, and wherein subframe configurations according to the UL-DL configurations are given as shown in the following table.

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In the above table, D denotes a DL subframe, U denotes a UL subframe, and S denotes a special subframe.

The first cell may be set to UL-DL configuration #0.

The first cell may be a primary cell (PCell), and the second cell may be a secondary cell (SCell).

The DL DCI format may further include a carrier indicator field (CIF).

The DL DCI format may include DCI format 1, 1A, 1B, 1C, 1D, 2, 2A, 2B, 2C, or 2D.

The HARQ-ACK information may include at least one of acknowledgement information about a physical downlink shared channel (PDSCH) signal indicated by the DL DCI format, and acknowledgement information about a physical downlink control channel (PDCCH) signal including the DL DCI format and indicating semi-persistent scheduling (SPS) release.

Advantageous Effects

According to the present invention, control information may be efficiently transmitted in a carrier aggregation (CA)-based wireless communication system. In addition, acknowledgement information on a downlink/uplink (DL/UL) signal may be efficiently transmitted and received.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 18 illustrates the structure of full duplex (FD)-TDD CA;

BEST MODE

Figure 1:
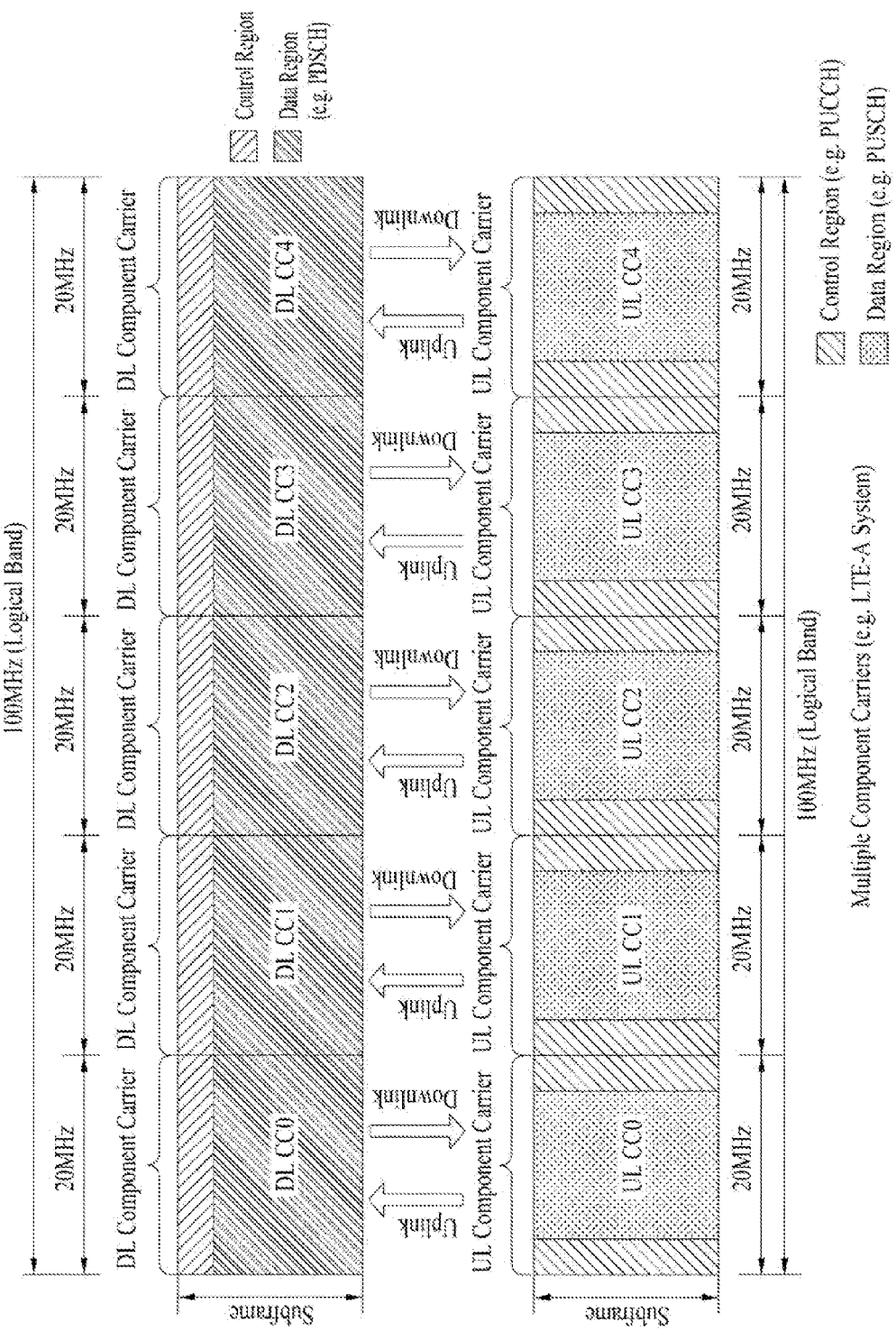
FIG. 1 illustrates a carrier aggregation (CA)-based wireless communication system.

Techniques described herein may be used in a variety of wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3rd Generation Partnership Project (3GPP) Long Term Evolution (LTE) is a part of Evolved UMTS (E-UMTS) using E-UTRA. LTE-Advanced (LTE-A) is an evolution of 3GPP LTE.

For clarity, the following description focuses on 3GPP LTE/LTE-A. However, technical features of the present invention are not limited thereto. It should be noted that specific terms used herein are provided for better understanding of the present invention, and the use of these specific terms may be changed to other formats within the technical scope or spirit of the present invention.

In a wireless communication system, a user equipment (UE) receives downlink (DL) information from a base station (BS), and transmits uplink (UL) information to the BS. In LTE(-A), DL transmission is performed using OFDMA, and UL transmission is performed using SC-FDMA.

The terms used in the specification will now be described.

HARQ-ACK (hybrid automatic repeat request acknowledgement): this represents an acknowledgement response, i.e., an acknowledgement (ACK)/negative acknowledgement (NACK)/discontinuous transmission (DTX) response (simply, ACK/NACK (response), A/N (response)), to downlink transmission (e.g. physical downlink shared channel (PDSCH) or semi-persistent scheduling release physical downlink control channel (SPS release PDCCH)). The ACK/NACK response refers to ACK, NACK, DTX, or NACK/DTX. A HARQ-ACK regarding a component carrier (CC) (or cell) or a HARQ-ACK of a CC refers to an ACK/NACK response to downlink transmission related to (e.g. scheduled for) the CC. A PDSCH can be replaced by a transport block (TB) or a codeword.

PDSCH: this includes a PDSCH corresponding to a DL grant PDCCH, and a semi-persistent scheduling (SPS) PDSCH.

SPS PDSCH: this is a PDSCH transmitted in DL using resources semi-statically configured according to SPS. The SPS PDSCH has no DL grant PDCCH corresponding thereto. The SPS PDSCH is used interchangeably with a PDSCH w/o PDCCH.

SPS release PDCCH: this refers to a PDCCH indicating SPS release. A UE feeds back ACK/NACK information about an SPS release PDCCH.

DAI (downlink assignment index): this is included in downlink control information (DCI) transmitted on a PDCCH. The DAI can indicate an order value or counter value of a PDCCH. A value indicated by a DAI field of a DL grant PDCCH is called a DL DAI ($V^{DL}_{DAI}$, simply V), and a value indicated by a DAI field of a UL grant PDCCH is called a UL DAI ($V^{UL}_{DAI}$, $W^{UL}_{DAI}$, simply W) for convenience.

PCC (primary component carrier) PDCCH: this indicates a PDCCH that schedules a PCC. That is, the PCC PDCCH represents a PDCCH corresponding to a PDSCH on the PCC. The PCC PDCCH is transmitted only on the PCC on the assumption that cross-carrier scheduling is not permitted for the PCC. The term PCC is used interchangeably with PCell (primary cell).

SCC (secondary component carrier) PDCCH: this indicates a PDCCH that schedules an SCC. That is, the SCC PDCCH represents a PDCCH corresponding to a PDSCH on the SCC. The SCC PDCCH can be transmitted on a CC (e.g. PCC) other than the SCC when cross-carrier scheduling is permitted for the SCC. The SCC PDCCH is transmitted only on the SCC when cross-carrier scheduling is not permitted for the SCC. The term SCC is used interchangeably with SCell (secondary cell).

Cross-carrier scheduling: this refers to an operation of transmitting a PDCCH that schedules an SCC through a CC (e.g. PCC) other than the SCC. All PDCCHs are scheduled/transmitted only through a PCC when only the PCC and one SCC are present.

Non-cross-carrier scheduling: this refers to an operation of scheduling/transmitting a PDCCH that schedules each CC through the corresponding CC.

FIG. 1 illustrates a carrier aggregation (CA)-based wireless communication system. Although an LTE system supports a single DL/UL frequency block only, to use a wider frequency band, the LTE-A system employs CA technology for aggregating a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 1, a plurality of UL/DL CCs can be aggregated to support a wider UL/DL bandwidth. The CCs may be contiguous or non-contiguous in the frequency domain. Bandwidths of the CCs may be determined independently. Asymmetrical CA in which the number of UL CCs is different from the number of DL CCs is also possible. For example, when there are two DL CCs and one UL CC, the DL CCs may correspond to the UL CC at a ratio of 2:1. DL CC/UL CC links may be fixed or semi-statically configured in the system. Although the system bandwidth is configured with N CCs, a frequency band usable by a specific UE may be restricted to L (<N) CCs. Various parameters about CA may be set cell-specifically, UE-group-specifically, or UE-specifically. Control information may be transmitted and received only in a specific CC. This specific CC may be referred to as a primary CC (PCC) (or anchor CC) and other CCs may be referred to as secondary CCs (SCCs).

In LTE(-A), the concept of a cell is used to manage radio resources. A cell is defined as a combination of DL resources and UL resources, and the UL resources are not mandatory. Accordingly, a cell may be configured with DL resources only or both DL resources and UL resources. When CA is supported, the linkage between carrier frequencies of DL resources (or DL CCs) and carrier frequencies of UL resources (or UL CCs) may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used in an initial connection establishment or connection re-establishment procedure of a UE. The PCell may refer to a cell indicated during handover. The SCell may be configured after a radio resource control (RRC) connection is established, and used to provide additional radio resources. The PCell and SCell may be collectively referred to as serving cells. Accordingly, only a single serving cell composed of a PCell exists for a UE in RRC_CONNECTED state, for which CA is not set or which does not support CA. On the other hand, a plurality of serving cells including a PCell and one or more SCells may be configured for a UE in RRC_CONNECTED state, for which CA is set.

Unless separately mentioned, the following description may be applied to each of a plurality of aggregated CCs (or cells). In addition, a CC in the following description may be replaced with a serving CC, serving carrier, cell, serving cell, etc.

Figure 2:
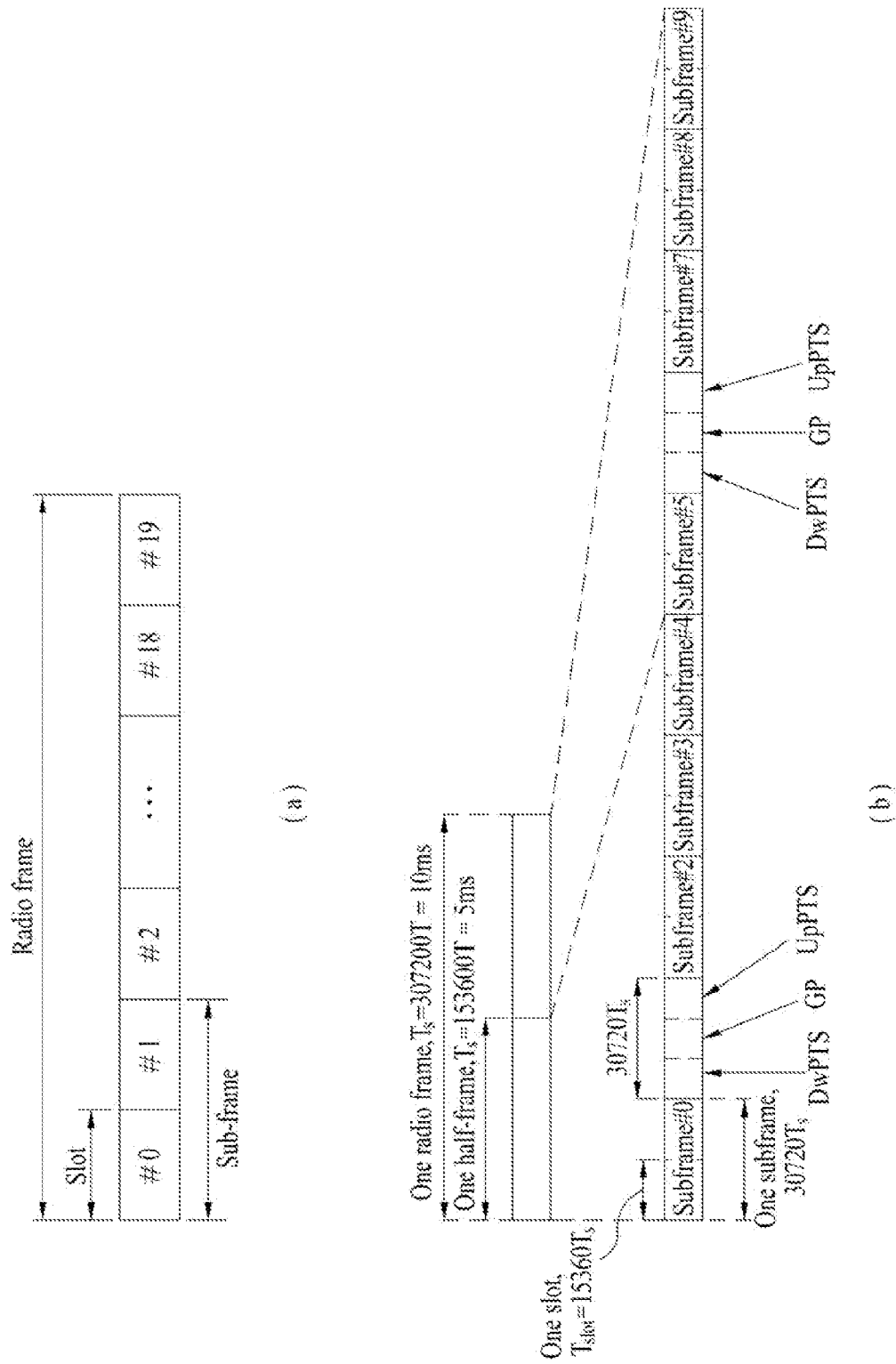
FIG. 2 illustrates the structure of a radio frame.

FIG. 2 illustrates the structure of a radio frame.

FIG. 2(a) illustrates the structure of a type-1 radio frame for frequency division duplex (FDD). A radio frame includes a plurality of (e.g., 10) subframes, and each subframe includes a plurality of (e.g., 2) slots in the time domain. Each subframe may have a length of 1 ms and each slot may have a length of 0.5 ms. A slot includes a plurality of OFDM/SC-FDMA symbols in the time domain and includes a plurality of resource blocks (RBs) in the frequency domain.

FIG. 2(b) illustrates the structure of a type-2 radio frame for time division duplex (TDD). The type-2 radio frame includes 2 half frames, and each half frame includes 5 subframes. One subframe includes 2 slots.

Table 1 shows uplink-downlink configurations (UL-DL Cfgs) of subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes a downlink pilot time slot (DwPTS), a guard period (GP), and an uplink pilot time slot (UpPTS). The DwPTS is a time period reserved for downlink transmission and the UpPTS is a time period reserved for uplink transmission.

Figure 3:
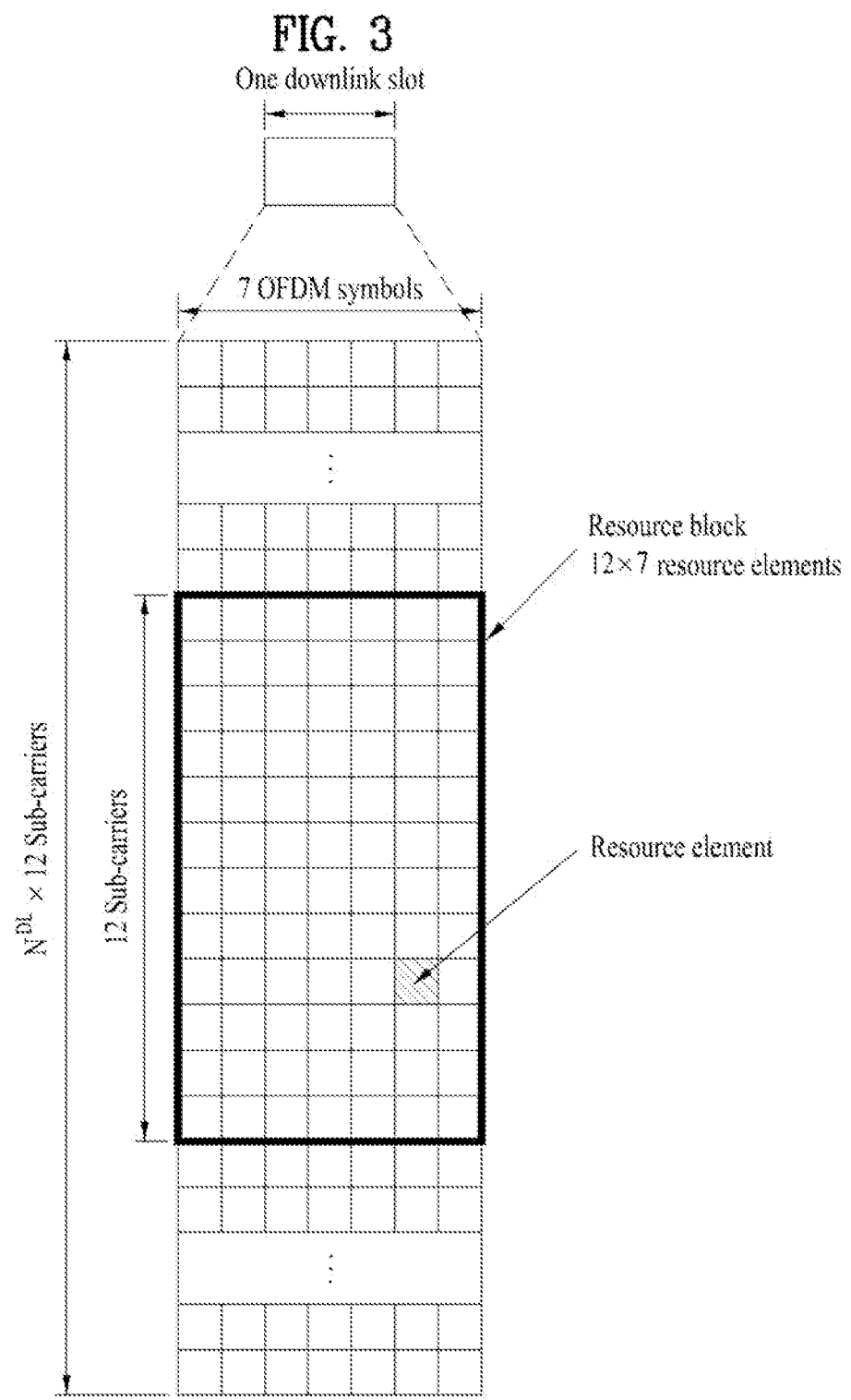
FIG. 3 illustrates a resource grid of a downlink (DL) slot.

FIG. 3 illustrates a resource grid of a DL slot.

Referring to FIG. 3, a DL slot includes a plurality of OFDMA (or OFDM) symbols in the time domain. One DL slot may include 7(6) OFDMA symbols, and one resource block (RB) may include 12 subcarriers in the frequency domain. Each element on the resource grid is referred to as a resource element (RE). One RB includes 12×7(6) REs. The number $N^{RB}$ of RBs included in the DL slot depends on a downlink transmit bandwidth. The structure of a UL slot may be same as that of the DL slot except that OFDMA symbols are replaced by SC-FDMA symbols.

Figure 4:
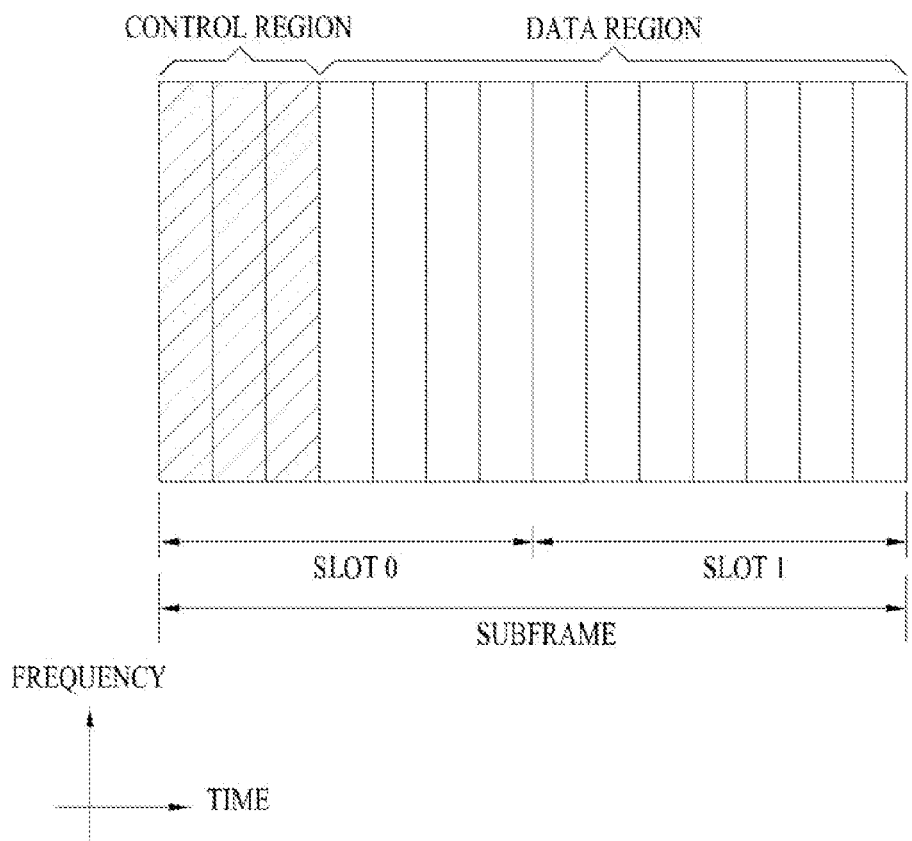
FIG. 4 illustrates the structure of a DL subframe.

FIG. 4 illustrates the structure of a DL subframe.

Referring to FIG. 4, up to 3(4) OFDMA symbols located in a front portion of a first slot within a subframe correspond to a control region to which a control channel is allocated. The remaining OFDMA symbols correspond to a data region to which a physical downlink shared chancel (PDSCH) is allocated. Examples of downlink control channels include a physical control format indicator channel (PCFICH), a physical downlink control channel (PDCCH), a physical HARQ indicator channel (PHICH), etc. The PCFICH is transmitted at a first OFDM symbol of a subframe and carries information regarding the number of OFDMA symbols used for transmission of control channels within the subframe. The PHICH is a response to uplink transmission and carries a HARQ acknowledgement (ACK)/negative acknowledgement (NACK) signal.

A PDCCH may carry a transmission format and resource allocation information of a downlink shared channel (DL-SCH), a transmission format and resource allocation information of an uplink shared channel (UL-SCH), paging information on a paging channel (PCH), system information on the DL-SCH, resource allocation information of an upper-layer control message such as a random access response transmitted on the PDSCH, a set of Tx power control commands on individual UEs within an arbitrary UE group, a Tx power control command, information on activation of a voice over IP (VoIP), etc.

Downlink control information (DCI) is transmitted on a PDCCH. DCI formats 0/4 (hereinafter referred to as UL DCI formats) is defined for UL scheduling (or UL grant), and DCI format 1/1A/1B/1C/1D/2/2A/2B/2C (hereinafter referred to as DL DCI format) is defined for DL scheduling. The DCI format selectively includes information such as hopping flag, RB allocation information, modulation coding scheme (MCS), redundancy version (RV), new data indicator (NDI), transmit power control (TPC), demodulation reference signal (DMRS) cyclic shift, depending on its use.

A plurality of PDCCHs may be transmitted within a control region. A UE may monitor the PDCCHs in every subframe to check a PDCCH designated to the UE. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A PDCCH coding rate may be controlled according to the number of CCEs (i.e., CCE aggregation level) used for PDCCH transmission. The CCE includes a plurality of resource element groups (REGs). A format of the PDCCH and the number of PDCCH bits are determined according to the number of CCEs. A BS determines a PDCCH format according to DCI to be transmitted to the UE, and attaches a cyclic redundancy check (CRC) to control information. The CRC is masked with an identifier (e.g., radio network temporary identifier (RNTI)) according to an owner or usage of the PDCCH. If the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Then, a description is now given of scheduling when a plurality of CCs (or cells) are configured. If a plurality of CCs are configured, cross-carrier scheduling scheme and non-cross-carrier scheduling (or self scheduling) scheme may be used. The non-cross-carrier scheduling (or self scheduling) scheme is the same as the legacy LTE scheduling scheme.

If cross-carrier scheduling is configured, a DL grant PDCCH may be transmitted in DL CC#0, and a corresponding PDSCH may be transmitted in DL CC#2. Likewise, a UL grant PDCCH may be transmitted in DL CC#0, and a corresponding physical uplink shared channel (PUSCH) may be transmitted in UL CC#4. For cross-carrier scheduling, a carrier indicator field (CIF) is used. Whether a CIF is present in a PDCCH may be determined through higher layer signaling (e.g., RRC signaling) using semi-static and UE-specific (or UE-group-specific) schemes.

Scheduling according to whether a CIF is set may be defined as described below.

CIF disabled: A PDCCH in a DL CC allocates PDSCH resources in the same DL CC or allocates PUSCH resources in one linked UL CC.

CIF enabled: A PDCCH in a DL CC may allocate PDSCH or PUSCH resources in a specific DL/UL CC among a plurality of aggregated DL/UL CCs, using a CIF.

When a CIF is present, a BS may allocate one or more PDCCH monitoring DL CCs (hereinafter referred to as monitoring CCs (MCCs)) to a UE. The UE may detect/decode a PDCCH in the MCCs. That is, if the BS schedules a PDSCH/PUSCH to the UE, a PDCCH is transmitted only in the MCCs. The MCCs may be set using UE-specific, UE-group-specific, or cell-specific scheme. The MCCs include a PCC.

Figure 5:
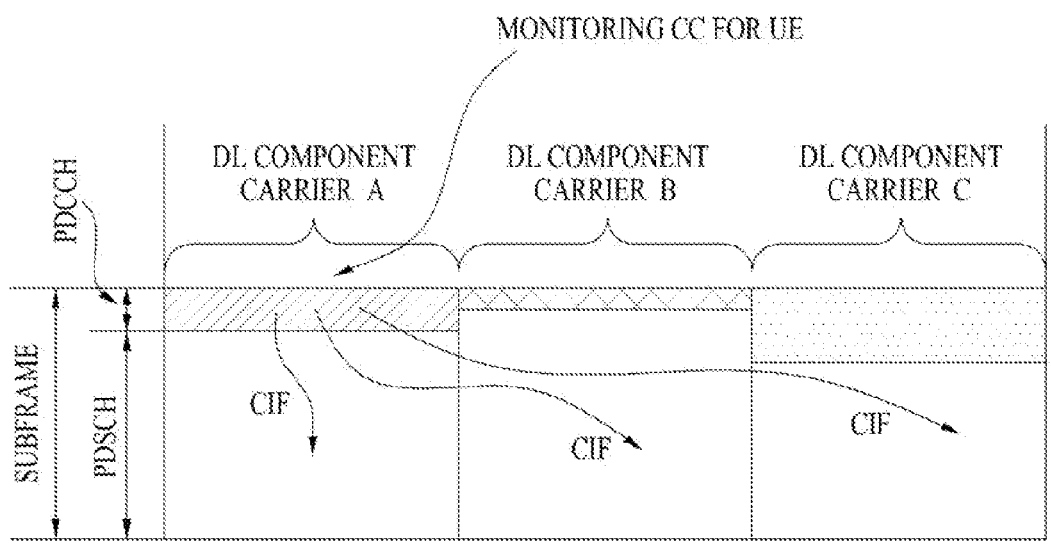
FIG. 5 illustrates a scheduling method when a plurality of cells are configured.

FIG. 5 illustrates cross-carrier scheduling. Although DL scheduling is illustrated in FIG. 5, the illustrated scheme is equally applied to UL scheduling.

Referring to FIG. 5, 3 DL CCs may be configured for a UE, and DL CC A may be set as a PDCCH monitoring DL CC (i.e., MCC). If a CIF is disabled, each DL CC may transmit a PDCCH for scheduling its PDSCH without the CIF according to the LTE PDCCH rules. On the other hand, if a CIF is enabled, DL CC A (i.e., MCC) may transmit not only a PDCCH for scheduling its PDSCH but also PDCCHs for scheduling PDSCHs of other CCs, using the CIF. In this example, DL CC B/C transmits no PDCCH.

Figure 6:
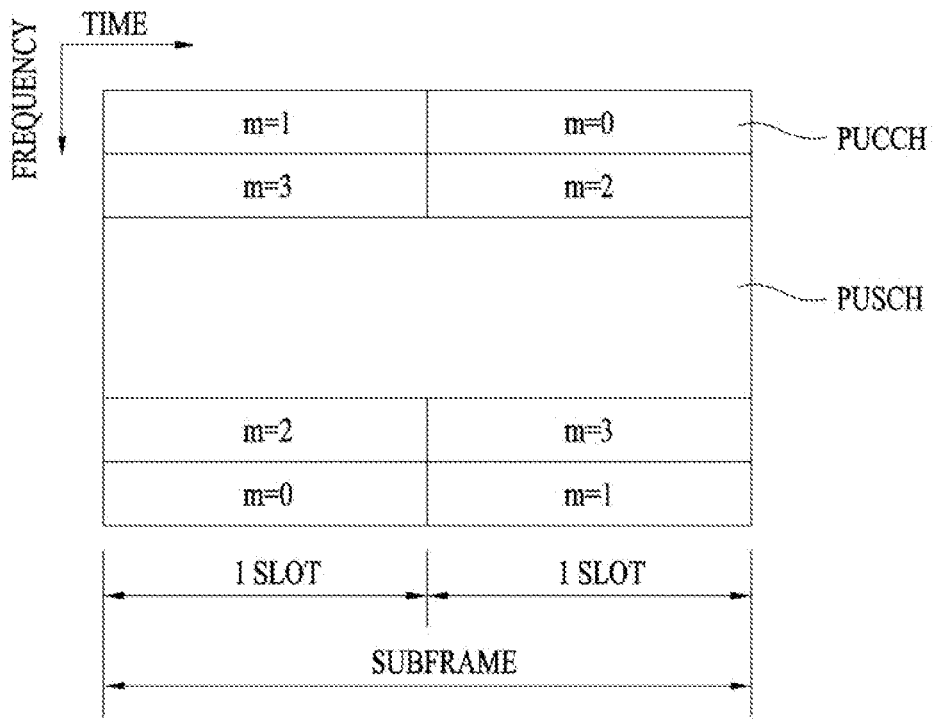
FIG. 6 illustrates the structure of an uplink (UL) subframe.

FIG. 6 illustrates the structure of a UL subframe.

Referring to FIG. 6, a UL subframe includes a plurality of (e.g. 2) slots. A slot may include different numbers of SC-FDMA symbols according to a CP length. The UL subframe is divided into a control region and data region in the frequency domain. The data region is allocated with a PUSCH and used to carry a data signal such as audio data. The control region is allocated a physical uplink control channel (PUCCH) and used to carry uplink control information (UCI). The PUCCH includes an RB pair located at both ends of the data region in the frequency domain and hopped in a slot boundary.

The PUCCH can be used to transmit the following control information.

SR (scheduling request): This is information used to request UL-SCH resources and is transmitted using on-off keying (OOK) scheme.

HARQ-ACK: This is a response signal to a downlink signal (e.g., PDSCH, SPS release PDCCH). For example, 1-bit ACK/NACK is transmitted as a response to one DL codeword and 2-bit ACK/NACK is transmitted as a response to two DL codewords.

CSI (Channel Status Information): This is feedback information on a DL channel and includes channel quality information (CQI), rank indicator (RI), precoding matrix indicator (PMI), precoding type indicator (PTI), etc.

Table 2 shows the mapping relationship between a PUCCH format and UCI in LTE(-A).

TABLE 2

| PUCCH Format | Uplink Control Information (UCI) |
|---|---|
| Format 1 | SR (scheduling request) (unmodulated waveform) |
| Format 1a | 1-bit HARQ-ACK/NACK (with/without SR) |
| Format 1b | 2-bit HARQ-ACK/NACK (with/without SR) |
| Format 2 | CSI (20 coded bits) |
| Format 2 | CSI and 1-bit or 2-bit HARQ-ACK/NACK (20 bits) (for extended CP only) |
| Format 2a | CSI and 1-bit HARQ-ACK/NACK (20 + 1 coded bits) |
| Format 2b | CSI and 2-bit HARQ-ACK/NACK (20 + 2 coded bits) |
| Format 3 (LTE-A) | Up to 24 bits of HARQ-ACK/NACK + SR |

Figure 7:
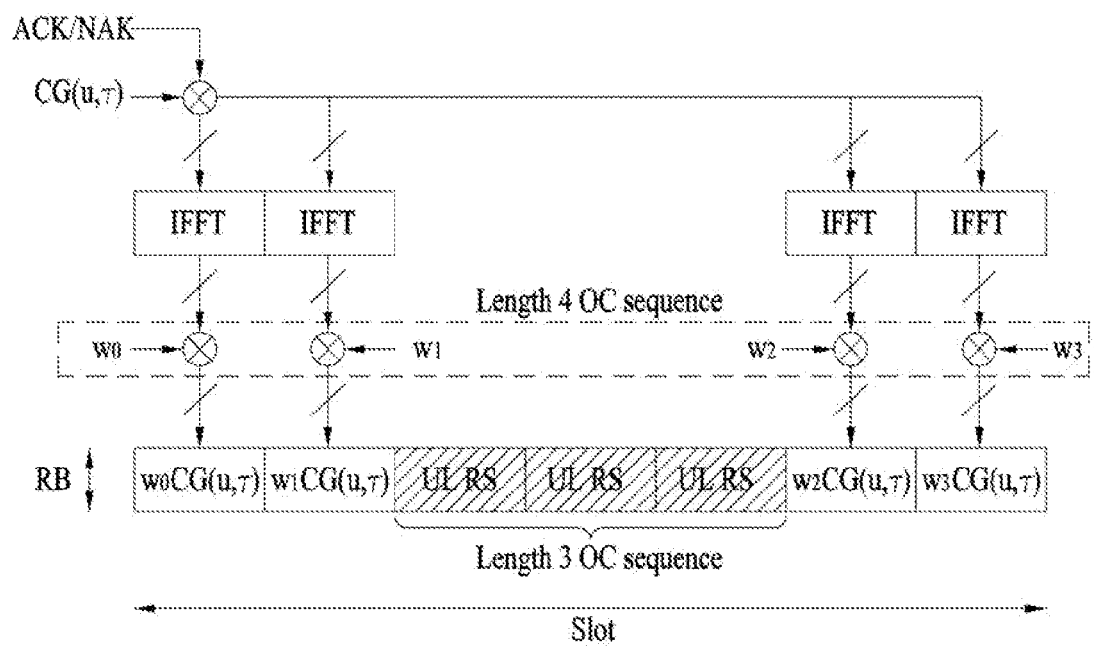
FIG. 7 illustrates the structures of physical uplink control channel (PUCCH) formats 1a and 1b in a slot level.

FIG. 7 illustrates the structures of PUCCH formats 1a and 1b in a slot level. In PUCCH formats 1a and 1b, the same control information is repeated on a slot basis in a subframe. Each UE transmits an ACK/NACK signal in different resources configured by a different cyclic shift (CS) (frequency-domain code) and a different orthogonal cover code (OCC) (time-domain spreading code) of a computer-generated constant amplitude zero auto correlation (CG-CAZAC) sequence. An OCC includes a Walsh/DFT orthogonal code. If the number of CSs is 6 and the number of OCs is 3, ACK/NACK signals of 18 UEs may be multiplexed into the same physical resource block (PRB).

Figure 8:
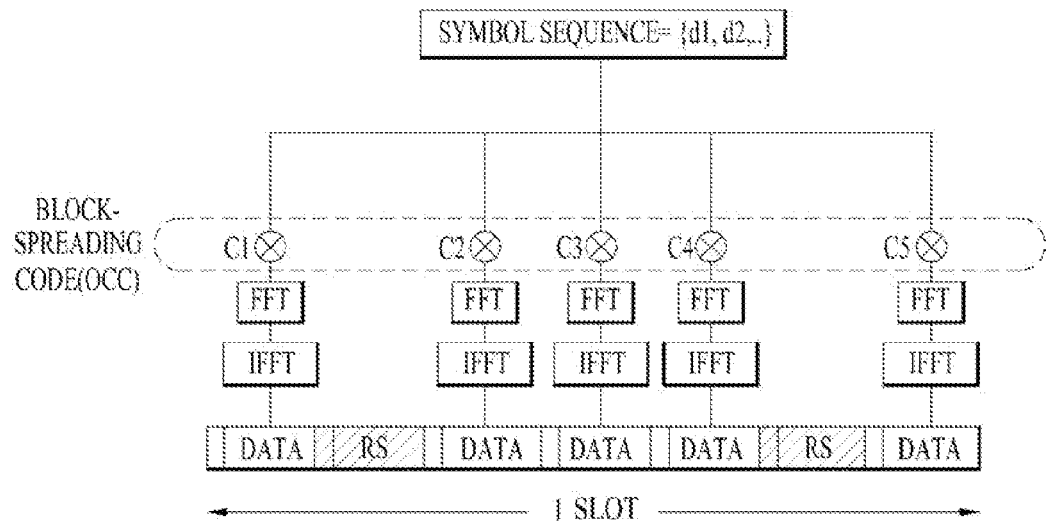
FIG. 8 illustrates the structure of PUCCH format 3 in a slot level.

FIG. 8 illustrates the structure of PUCCH format 3 in a slot level. PUCCH format 3 is used to transmit a plurality of pieces of ACK/NACK information, and information such as an SR may be transmitted together.

Referring to FIG. 8, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, ... } using a length-5 OCC. Here, the symbol sequence {d1, d2, ... } may be a modulation symbol sequence or a codeword bit sequence. The symbol sequence {d1, d2, ... } may be generated by performing joint coding (e.g., Reed-Muller coding, tail-biting convolutional coding, etc.), block-spreading, and SC-FDMA modulation on a plurality of pieces of ACK/NACK information.

Figure 9:
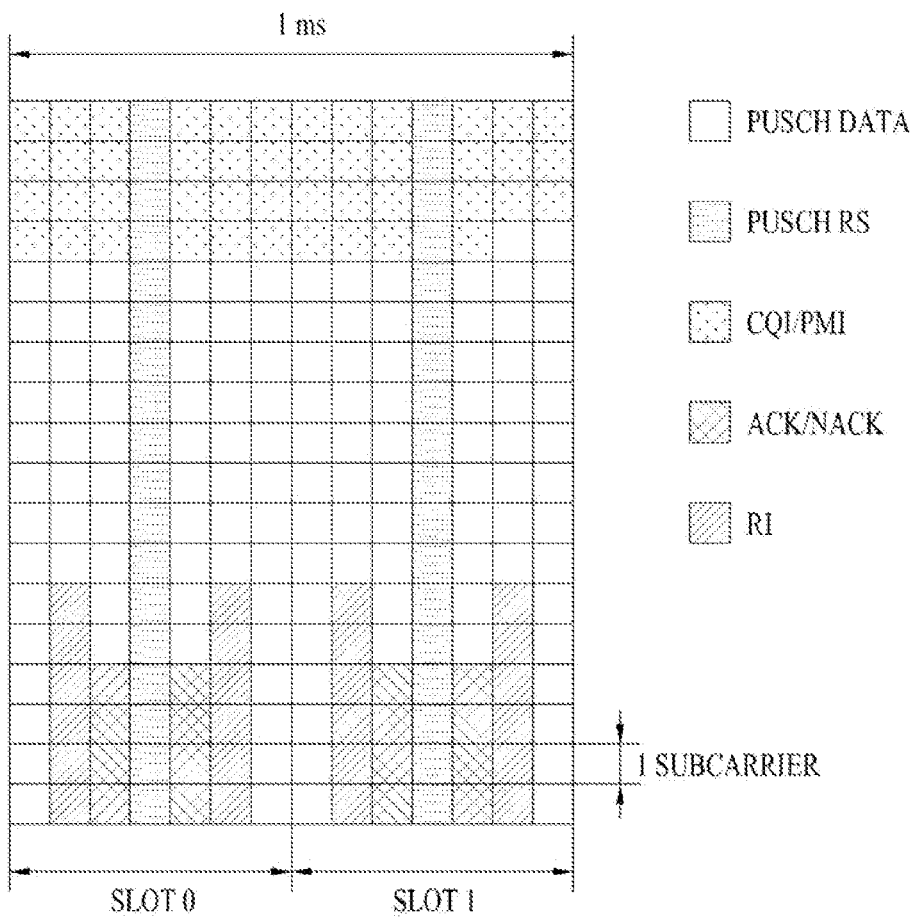
FIG. 9 illustrates a method for transmitting uplink control information (UCI) on a physical uplink shared channel (PUSCH)

FIG. 9 illustrates a method for transmitting UCI on a PUSCH. A subframe which requires UCI transmission has PUSCH assignment, UCI may be transmitted on a PUSCH (PUSCH piggyback). Specifically, an ACK/NACK is punctured into a part of resources of SC-FDMA to which UL-SCH data is mapped. The ACK/NACK is located adjacent to a reference signal (RS). The UCI may be scheduled to be transmitted on the PUSCH without UL-SCH data.

A description is now given of an ACK/NACK transmission procedure in a TDD-configured CC (or cell) and a signal transmission timing thereof with reference to FIGS. 10 to 15.

Figure 10:
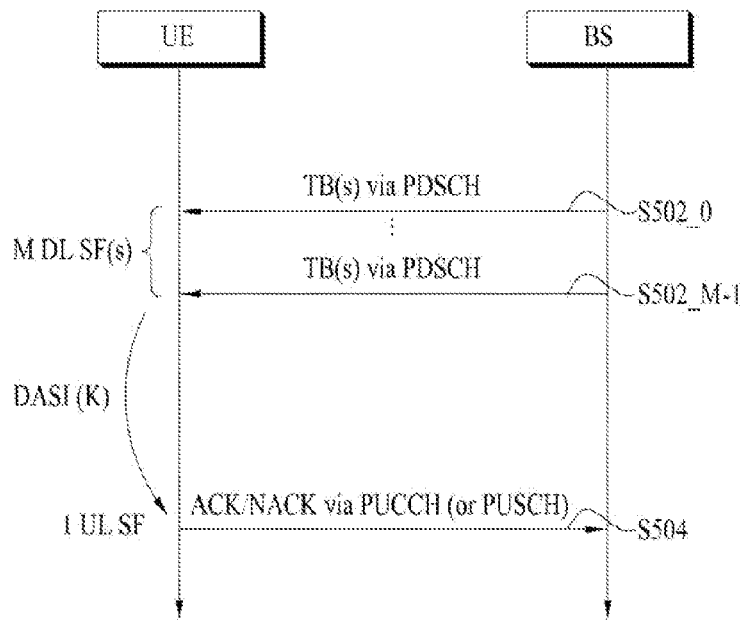
FIGS. 10 and 11 illustrate UL acknowledgement (ACK)/negative acknowledgement (NACK) timing of a time division duplex (TDD)-configured cell.
Figure 11:
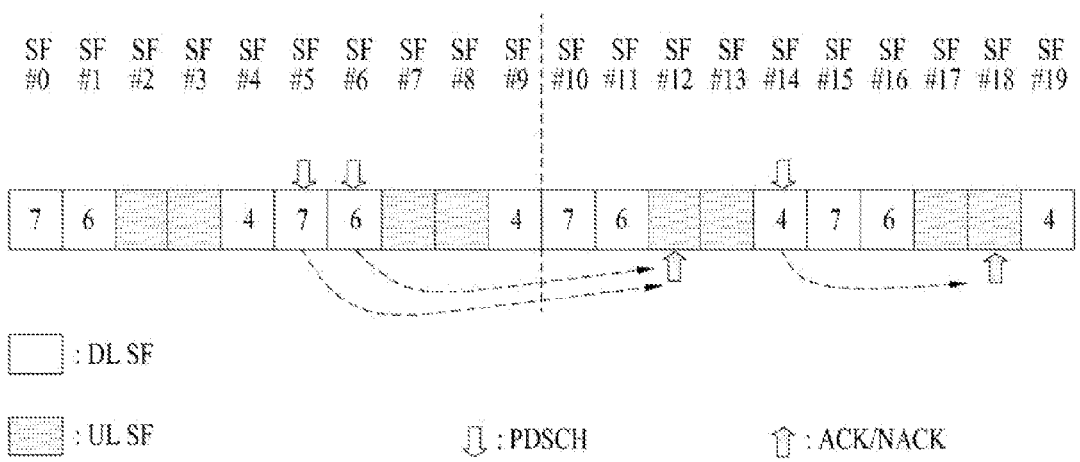

FIGS. 10 and 11 illustrate ACK/NACK (A/N) timing (or HARQ timing).

Referring to FIG. 10, a UE may receive one or more PDSCH signals in M DL subframes (SFs) (S502_0 to S502_M−1) (M≥1). Each PDSCH signal may include one or more (e.g., 2) transport blocks (TBs) according to a transmission mode. Although not shown in FIG. 10, a PDCCH signal indicating SPS release may also be received in steps S502_0 to S502_M−1. When a PDSCH signal and/or SPS release PDCCH signal are present in the M DL subframes, the UE transmits an ACK/NACK in one UL subframe corresponding to the M DL subframes through a procedure for ACK/NACK transmission (e.g. ACK/NACK (payload) generation, ACK/NACK resource allocation, etc.) (S504). The ACK/NACK includes acknowledgement information on the PDSCH signal and/or SPS release PDCCH signal of steps S502_0 to S502_M−1.

Although the ACK/NACK is basically transmitted on a PUCCH, if there is PUSCH transmission at ACK/NACK transmission timing, the ACK/NACK is transmitted on a PUSCH. If a plurality of CCs are configured for the UE, the PUCCH is transmitted only in a PCC, and the PUSCH is transmitted in a scheduled CC. A variety of PUCCH formats shown in Table 2 may be used for ACK/NACK transmission. Furthermore, a variety of schemes such as ACK/NACK bundling, ACK/NACK channel selection, etc. may be used to reduce the number of ACK/NACK bits to be transmitted in the PUCCH format.

As described above, in TDD, an ACK/NACK of DL signals received in M DL subframes is transmitted in one UL subframe (i.e., M DL SF(s):1 UL SF), and the relationship therebetween is given by a downlink association set index (DASI).

Table 3 shows a DASI (K: $\{k_0, k_1, \ldots, k_{M-1}\}$) defined for LTE(-A). Table 3 shows the interval between a UL subframe for transmitting an ACK/NACK, and a DL subframe associated with the UL subframe. Specifically, if a PDCCH indicating PDSCH transmission and/or SPS release is present in subframe n−k (k∈K), a UE transmits an ACK/NACK in subframe n.

TABLE 3

| TDD UL-DL | Subframe n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 11 illustrates A/N timing applied to a CC having UL-DL Cfg #1. In FIG. 11, SF#0 to SF#9, and SF#10 to SF#19 correspond to radio frames. The numeral in a box denotes a DL subframe associated with a UL subframe. For example, an ACK/NACK of a PDSCH of SF#5 is transmitted in SF#5+7 (=SF#12), and an ACK/NACK of a PDSCH of SF#6 is transmitted in SF#6+6 (=SF#12). That is, an ACK/NACK of SF#5/SF#6 is transmitted in SF#12. Likewise, an ACK/NACK of a PDSCH of SF#14 is transmitted in SF#14+4 (=SF#18).

Figure 12:
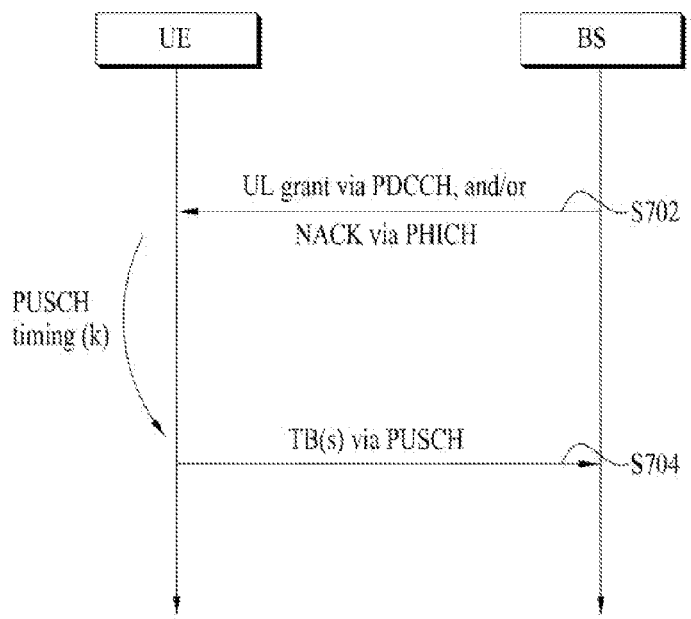
FIGS. 12 to 15 illustrate UL grant/physical hybrid automatic repeat request (HARQ) indicator channel (PHICH) transmission timing of a TDD-configured cell.
Figure 13:
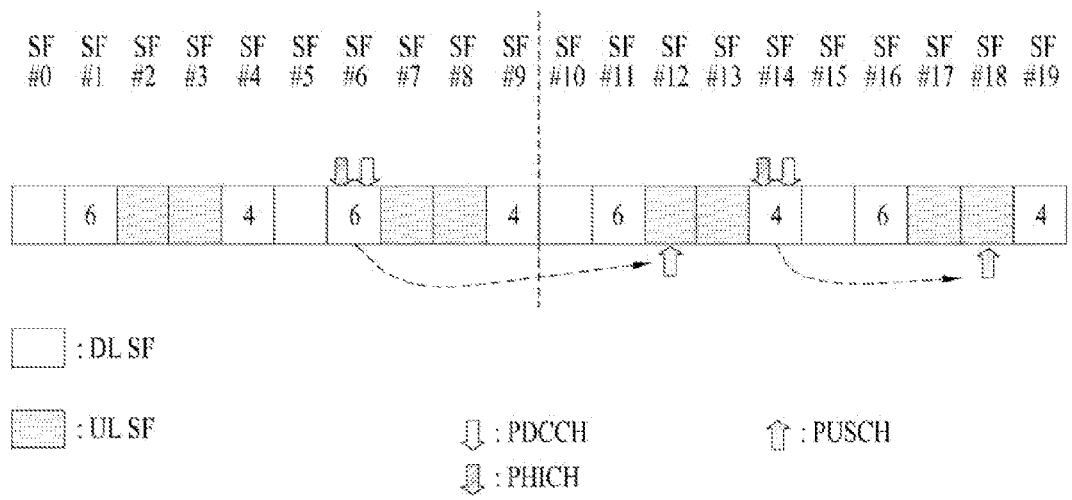

FIGS. 12 and 13 illustrate UL grant (UG)/PHICH-PUSCH timing. A PUSCH may be transmitted in response to a PDCCH (UL grant) and/or PHICH (NACK).

Referring to FIG. 12, a UE may receive a PDCCH (UL grant) and/or PHICH (NACK) (S702). Here, the NACK corresponds to an ACK/NACK response to previous PUSCH transmission. In this case, the UE may initially transmit or retransmit one or more TBs on a PUSCH after k subframes through a procedure for PUSCH transmission (e.g., TB coding, TB-CW swapping, PUSCH resource allocation, etc.) (S704). This example assumes a normal HARQ operation in which a PUSCH is transmitted once. In this case, a PHICH/UL grant corresponding to PUSCH transmission is present in the same subframe. However, in subframe bundling in which a PUSCH is transmitted a plurality of times in a plurality of subframes, a UL grant/PHICH corresponding to PUSCH transmission may be present in different subframes.

Table 4 shows an uplink association index (UAI) (k) for PUSCH transmission in LTE(-A). Table 4 shows the interval between a DL subframe in which a PHICH/UL grant is detected, and a UL subframe associated with the DL subframe. Specifically, if a PHICH/UL grant is detected in subframe n, a UE may transmit a PUSCH in subframe n+k.

TABLE 4

| TDD UL-DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | 4 | 6 | | | | |
| 1 | | 6 | | 4 | | | 6 | | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 13 illustrates PUSCH transmission timing when UL-DL Cfg #1 is set. In FIG. 13, SF#0 to SF#9, and SF#10 to SF#19 correspond to radio frames. The numeral in a box denotes a UL subframe associated with a DL subframe. For example, a PUSCH for a PHICH/UL grant of SF#6 is transmitted in SF#6+6 (=SF#12), and a PUSCH for a PHICH/UL grant of SF#14 is transmitted in SF#14+4 (=SF#18).

Figure 14:
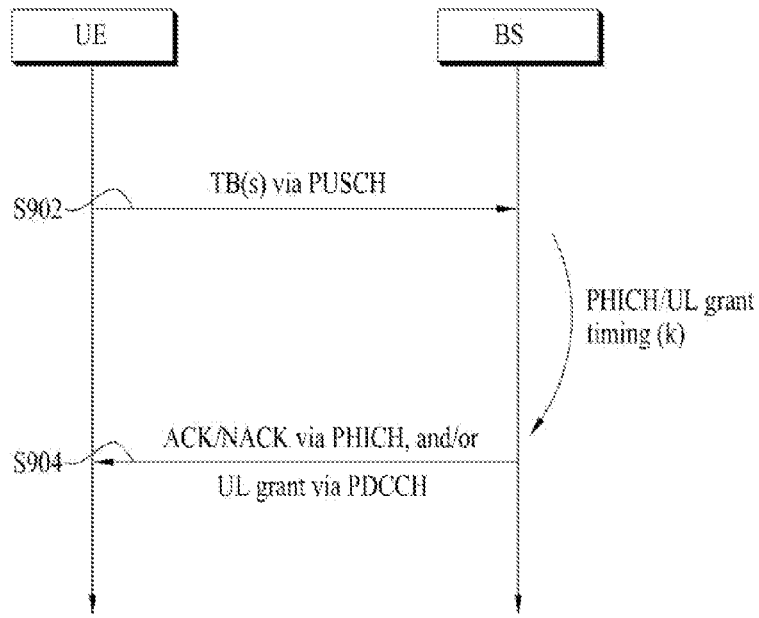
Figure 15:
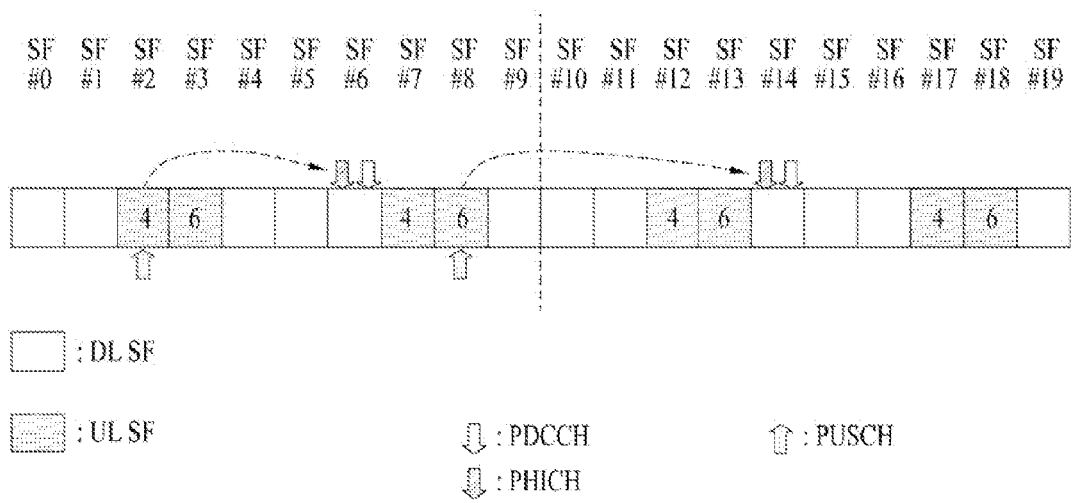

FIGS. 14 and 15 illustrate PUSCH-UL grant (UG)/PHICH timing. A PHICH is used to transmit a DL ACK/NACK. Here, the DL ACK/NACK is a response to UL data (e.g., PUSCH) and refers to an ACK/NACK transmitted in downlink.

Referring to FIG. 14, a UE transmits a PUSCH signal to a BS (S902). Here, the PUSCH signal is used to transmit one or more (e.g., 2) TBs according to a transmission mode. As a response to PUSCH transmission, the BS may transmit an ACK/NACK to the UE on a PHICH after k subframes through a procedure for ACK/NACK transmission (e.g., ACK/NACK generation, ACK/NACK resource allocation, etc.) (S904). The ACK/NACK includes acknowledgement information on the PUSCH signal of step S902. If the response to PUSCH transmission is a NACK, the BS may transmit a UL grant PDCCH for retransmitting the PUSCH, to the UE after k subframes (S904). This example assumes a normal HARQ operation in which a PUSCH is transmitted once. In this case, a UL grant/PHICH corresponding to PUSCH transmission may be transmitted in the same subframe. However, in subframe bundling, a UL grant/PHICH corresponding to PUSCH transmission may be transmitted in different subframes.

Table 5 shows PHICH timing defined for TDD. For PUSCH transmission of subframe #n, a UE determines corresponding PHICH resources in subframe $\#(n+k_{PHICH})$.

TABLE 5

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15 illustrates UL grant/PHICH transmission timing when UL-DL Cfg #1 is set. In FIG. 15, SF#0 to SF#9, and SF#10 to SF#19 correspond to radio frames. The numeral in a box denotes a DL subframe associated with a UL subframe. For example, a PHICH/UL grant corresponding to a PUSCH of SF#2 is transmitted in SF#2+4 (=SF#6), and a UL grant/PHICH corresponding to a PUSCH of SF#8 is transmitted in SF#8+6 (=SF#14).

In a TDD-configured CC (or cell), when a UE transmits an ACK/NACK signal to a BS, if the UE has missed a part of PDCCH(s) transmitted from the BS in a period of a plurality of subframes, the UE does not even know that a PDSCH corresponding to the missed PDCCH was transmitted to the UE and thus an error may occur in generating ACK/NACK.

To solve this problem, a DL grant PDCCH/SPS release PDCCH for a TDD CC includes a DAI field (i.e., DL DAI field). The value of DL DAI field designates an cumulative value (i.e., count) of PDCCH(s) corresponding to PDSCH(s) and PDCCH(s) indicating downlink SPS release to a current subframe within DL subframe(s) n-k (k∈K). For example, if 3 DL subframes correspond to one UL subframe, PDSCHs transmitted in a period of 3 DL subframes are sequentially indexed (i.e., sequentially counted) and the index (or count) is delivered on a PDCCH for scheduling the PDSCHs. The UE may determine whether a previous PDCCH is appropriately received, by checking DAI information of the PDCCH.

Figure 16:
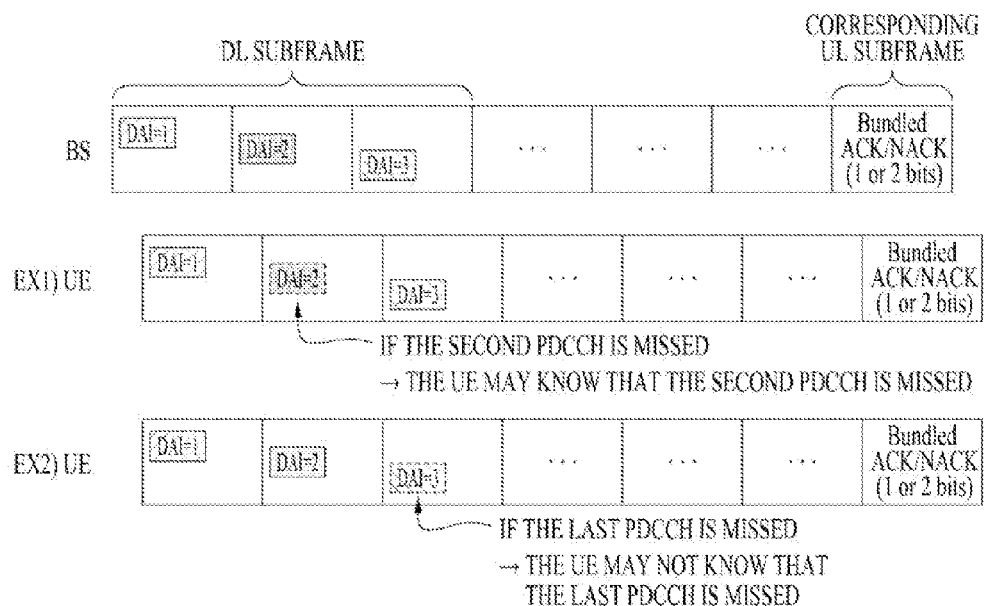
FIG. 16 illustrates an ACK/NACK transmission procedure using a downlink assignment index (DAI)

FIG. 16 illustrates an ACK/NACK transmission procedure using a DL DAI. This example assumes a TDD system configured by 3 DL subframes:1 UL subframe. It is assumed for convenience that a UE transmits ACK/NACK using PUSCH resources. In LTE, when ACK/NACK is transmitted on a PUSCH, 1-bit or 2-bit bundled ACK/NACK is transmitted.

Referring to FIG. 16, if the second PDCCH is missed as shown in Example 1, since a DL DAI value of the third PDCCH is different from a currently detected number of PDCCHs, the UE may know that the second PDCCH is missed. In this case, the UE may process an ACK/NACK response to the second PDCCH as a NACK (or NACK/DTX). On the other hand, if the last PDCCH is missed as shown in Example 2, since the last detected DAI value of a PDCCH is equal to a currently detected number of PDCCHs, the UE may not recognize that the last PDCCH is missed (i.e., DTX). Accordingly, the UE recognizes that only two PDCCHs are scheduled for a DL subframe period. In this case, the UE bundles ACK/NACK corresponding to first two PDCCHs and thus an error occurs in an ACK/NACK feedback procedure. To solve this problem, a UL grant PDCCH also includes a DAI field (i.e., UL DAI field). The UL DAI field is a 2-bit field and includes information about the number of scheduled PDCCHs.

Table 6 shows values $(V^{DL}_{DAI}, V^{UL}_{DAI})$ indicated by a DAI field in a DCI format. $V^{DL}_{DAI}$ denotes a DL DAI value, and $V^{UL}_{DAI}$ denotes a UL DAI value. $V^{DL}_{DAI}$ denotes the value of DAI field in DCI format 1/1A/1B/1D/2/2A/2B/2C/2D for UL-DL Cfgs #0 to #6. $V^{UL}_{DAI}$ denotes the value of DAI field in DCI format 0/4 (i) if one CC (or cell) having UL-DL Cfgs #1 to #6 is configured, or (ii) if a UE is configured not to use PUCCH format 3.

TABLE 6

| DAI MSB, LSB | $V_{DAI}^{UL}$ or $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit. LSB: Least significant bit.

Table 7 shows a value $(W^{UL}_{DAI})$ indicated by a DAI field in DCI format 0/4. $W^{UL}_{DAI}$ denotes the value of DAI field in DCI format 0/4 (i) if a plurality of CCs (or cells) having UL-DL Cfgs #1 to #6 are configured, or (ii) if one CC (or cell) having UL-DL Cfgs #1 to #6 is configured and a UE is configured to use PUCCH format 3.

TABLE 7

| DAI MSB, LSB | $W_{DAI}^{UL}$ |
|---|---|
| 0, 0 | 1 |
| 0, 1 | 2 |
| 1, 0 | 3 |
| 1, 1 | 4 |

MSB: Most significant bit. LSB: Least significant bit.

For convenience, unless otherwise mentioned, DL DAI is referred to as V, and UL DAI is referred to as W.

DAI is used in various ways in an ACK/NACK transmission procedure. For example, a DAI may be used for DTX detection as illustrated in FIG. 16, or used in an ACK/NACK payload generating procedure (e.g., determination of the size of ACK/NACK payload and the location of ACK/NACK information in the ACK/NACK payload) or ACK/NACK resource allocation procedure.

Initially, a description is now given of DTX detection using a DAI. Referring back to FIG. 16, when $V^{UL}_{DAI} \neq (U_{DAI} + N_{SPS} - 1) \mod 4 + 1$ it is assumed that at least one DL assignment is missed (i.e., DTX occurs), and a UE generates a NACK of all codewords according to a bundling procedure. $U_{DAI}$ denotes a total number of DL grant PDCCHs and SPS release PDCCHs detected in subframe n-k (k∈K) (see Table 3). $N_{SPS}$ denotes the number of SPS PDSCHs and is 0 or 1.

Then, a description is now given of ACK/NACK payload generation using a DAI. It is assumed for convenience that PUCCH format 3 is configured. ACK/NACK payloads for PUCCH format 3 are configured per cell, and arranged in the order of cell indices. Specifically, HARQ-ACK feedback bits for a c-th serving cell (or DL CC) are given as $o_{c,0}^{ACK}$ $o_{c,1}^{ACK}, \ldots, o_{c,O_c^{ACK}-1}^{ACK}$ (c≥0). $O^{ACK}_c$ denotes the number of bits (i.e., size) of HARQ-ACK payload of the c-th serving cell. Regarding the c-th serving cell, if a transmission mode for supporting transmission of a single TB is configured or if space bundling is applied, it may be given as $O^{ACK}_c=B^{DL}_c$.

On the other hand, regarding the c-th serving cell, if a transmission mode for supporting transmission of a plurality of (e.g., 2) TBs is configured and space bundling is not applied, it may be given as $O^{ACK}_c=2B^{DL}_c$. If the HARQ-ACK feedback bits are transmitted on a PUCCH or if the HARQ-ACK feedback bits are transmitted on a PUSCH but there is no W corresponding to the PUSCH (e.g., SPS-based PUSCH), it is given as $B^{DL}_c=M$. M denotes the number of elements in set K defined in Table 3. If the TDD UL-DL Cfg is #1, #2, #3, #4, or #6 and if the HARQ-ACK feedback bits are transmitted on a PUSCH, it is given as $B^{DL}_c=W^{UL}_{DAI}$. $W^{UL}_{DAI}$ denotes a value indicated by a UL DAI field in a UL grant PDCCH (Table 7), and is simply referred to as W. If the TDD UL-DL Cfg is #5, it is given as $B_c^{DL}=W_{DAI}^{UL}+4\lceil(U-W_{DAI}^{UL})/4\rceil$. Here, U denotes a maximum value among Ucs, and Uc denotes a total number of PDSCH(s) received and PDCCHs indicating (downlink) SPS release in subframe n-k in the c-th serving cell. Subframe n is a subframe for transmitting the HARQ-ACK feedback bits. $\lceil \ \rceil$ denotes a ceiling function.

Regarding the c-th serving cell, if a transmission mode for supporting transmission of a single TB is configured or if space bundling is applied, the location of each ACK/NACK in HARQ-ACK payload of the serving cell is given as $o_{c,DAI(k)-1}^{ACK}$. DAI(k) denotes a DL DAI value of a PDCCH detected in DL subframe n-k. On the other hand, regarding the c-th serving cell, if a transmission mode for supporting transmission of a plurality of (e.g., 2) TBs is configured and space bundling is not applied, the location of each ACK/NACK in HARQ-ACK payload of the serving cell is given as $o_{c,2DAI(k)-2}^{ACK}$ $o_{c,2DAI(k)-1}^{ACK}$. $o_{c,2DAI(k)-2}^{ACK}$ denotes HARQ-ACK for codeword 0, and $o_{c,2DAI(k)-1}^{ACK}$ denotes HARQ-ACK for codeword 1. Codeword 0 and codeword 1 may respectively correspond to TB0 and TB1, or TB1 and TB0 according to swapping. If PUCCH format 3 is transmitted in a subframe configured for SR transmission, PUCCH format 3 transmits ACK/NACK bits and a 1-bit SR together.

A beyond LTE-A system considers aggregation of a plurality of CCs having different subframe configurations. For example, a plurality of CCs having different subframe configurations includes aggregation of a plurality of CCs having different UL-DL Cfgs (referred to as different TDD CA for convenience). Although different TDD CA is assumed in the following description, aggregation of a plurality of CCs having different subframe configurations is not limited thereto. In different TDD CA, A/N timing (see FIGS. 10 and 11) set for a PCC and SCC may be different according to UL-DL Cfgs of the corresponding CCs. Accordingly, UL SF timing for transmitting A/N may be set differently for the PCC and SCC with respect to the same DL SF timing, and a DL SF group for which A/N feedback is transmitted may be set differently for the PCC and the SCC with respect to the same UL SF timing. Furthermore, link directions (i.e. DL/UL) of the PCC and SCC may be set differently with respect to the same SF timing.

In addition, the beyond LTE-A system considers to support cross-CC scheduling even when a plurality of CCs having different subframe configurations are aggregated. In this case, UL grant/PHICH timing (see FIGS. 12 to 15) configured for an MCC and SCC may be different. For example, a DL SF for transmitting a UL grant/PHICH may be configured differently for the MCC and SCC with respect to the same UL SF. Furthermore, a UL SF group for which a UL grant or PHICH feedback is transmitted may be configured differently for the MCC and SCC with respect to the same DL SF. In this case, link directions of the MCC and SCC may be configured differently with respect to the same SF timing. For example, specific SF timing may be configured as a DL SF for transmitting a UL grant/PHICH in the SCC, and configured as a UL SF in the MCC.

When SF timing at which link directions of the PCC and SCC are different (hereinafter referred to as a collided SF) is present due to different subframe configurations (e.g., different TDD CA configurations), only a CC from the PCC and SCC, which has a specific link direction or has the same link direction as that of a specific CC (e.g. PCC), may be utilized at the SF timing due to the hardware configuration of the UE or another reason/purpose. For convenience, this scheme is referred to as half duplex (HD)-TDD CA. For example, when SF collision occurs because specific SF timing is configured as a DL SF in the PCC and configured as a UL SF in the SCC, only the PCC having a DL direction (i.e. DL SF set for the PCC) may be utilized and the SCC having a UL direction (i.e. UL SF set for the SCC) may not be utilized at the SF timing (or vice versa).

In this case, to transmit A/N feedback about a DL signal transmitted in DL SFs of all CCs, through the PCC, a scheme for applying A/N timing (set for a specific UL-DL Cfg) differently per CC or commonly to all CCs may be considered. Here, the specific UL-DL Cfg (hereinafter referred to as a reference configuration (Ref-Cfg)) may be the same as a UL-DL Cfg configured for the PCC or SCC or determined as another UL-DL Cfg. Although the Ref-Cfg is illustrated in view of A/N timing in FIGS. 17 and 18, the Ref-Cfg may also be defined in view of UL grant/PHICH timing. In this case, a Ref-Cfg for A/N timing (hereinafter referred to as an A/N timing Ref-Cfg) and a Ref-Cfg for UL grant/PHICH timing (hereinafter referred to as a UL grant/PHICH timing Ref-Cfg) are given independently. Simply, the A/N timing Ref-Cfg may be referred to as a DL-Ref UL/DL configuration, and the UL grant/PHICH timing Ref-Cfg may be referred to as a UL-Ref UL/DL configuration.

In HD-TDD CA, the number of DL SFs for which A/N feedback is transmitted (hereinafter referred to as A/N-DL SFs) at one UL SF timing may be set differently for a PCC and SCC. In other words, if the number of DL SFs corresponding to one UL SF (referred to as A/N-DL SFs for convenience) is defined as M, the value M may be set differently or independently for CCs with respect to one PCC UL SF (the value M for each CC: Mc). If an A/N timing Ref-Cfg of a specific XCC (PCC or SCC) is not the same as a PCC UL-DL Cfg (i.e., PCC-Cfg), an A/N-DL SF index of the XCC set at PCC UL SF timing may be different from an A/N-DL SF index achieved when A/N timing of an original PCC-Cfg is applied. Particularly, if PUCCH resources linked to CCE resources of a PDCCH for scheduling DL data are referred to as an implicit PUCCH, the implicit PUCCH may not be defined (in a PCC UL SF for transmitting A/N) for a specific XCC DL SF (a PDCCH for scheduling DL data to be transmitted therein) even in cross-CC scheduling.

Figure 17:
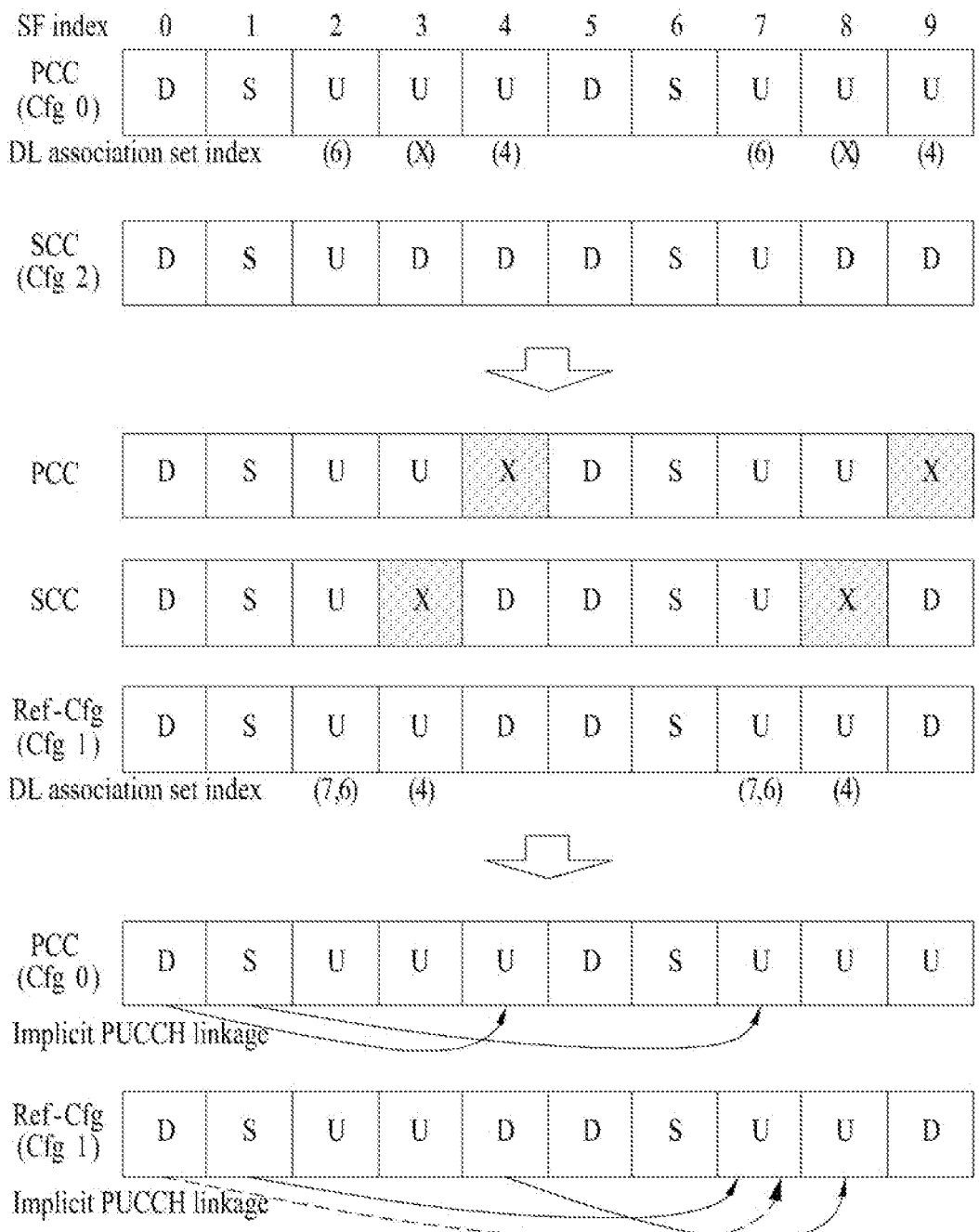
FIG. 17 illustrates the structure of half duplex (HD)-TDD CA.

FIG. 17 illustrates the structure of HD-TDD CA. In FIG. 17, shaded parts X denote a CC (link direction), use of which is prohibited in a collided SF, and a dotted arrow denotes a DL SF corresponding to a PCC UL SF to which an implicit PUCCH is not linked.

Figure 18:
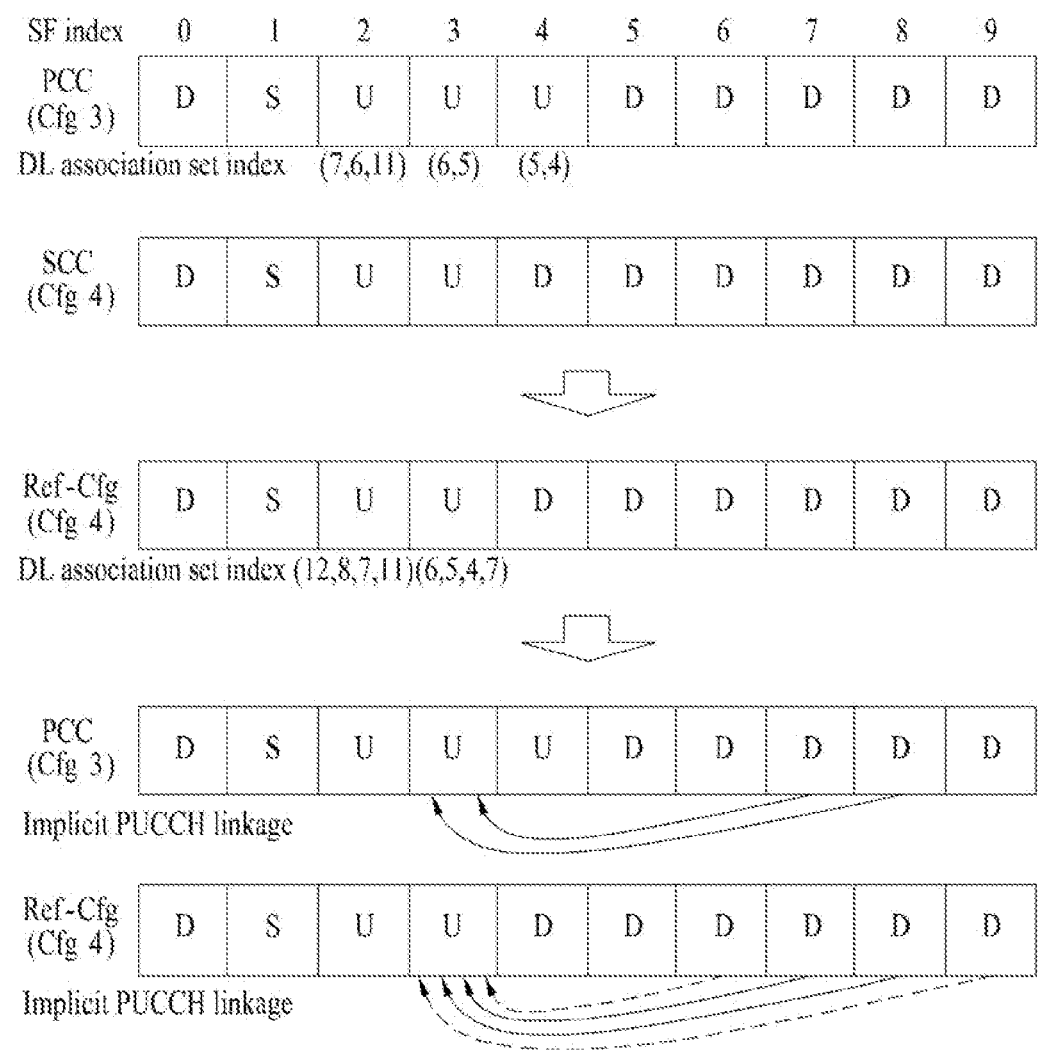

A scheme for allowing simultaneous DL/UL transmission and reception in a collided SF in which link directions of a PCC and SCC are different may be considered. For convenience, this scheme is referred to as full duplex (FD)-TDD CA. In this case, A/N timing set for a specific (A/N timing) Ref-Cfg may also be applied differently to each CC or commonly to all CCs in order to transmit A/N feedback for DL SFs of all CCs in one PCC UL SF. The (A/N timing) Ref-Cfg may be the same as a PCC-Cfg or SCC-Cfg or given as another UL-DL Cfg. In FD-TDD CA, a value M may be set differently or independently for CCs with respect to one PCC UL SF, and implicit PUCCH resources may not be defined in (a PCC UL SF corresponding to) an XCC DL SF even in cross-carrier scheduling. FIG. 18 illustrates the structure of FD-TDD CA, and a dotted arrow denotes a DL SF corresponding to a PCC UL SF to which implicit PUCCH resources are not linked.

Embodiment

Control Information Signaling in Aggregation of CCs Having Different Subframe Configurations Referring to Tables 6 and 7, a DAI is used for CCs having UL-DL Cfgs #1 to #6, and not used for a CC having UL-DL Cfg #0 (UL-DL Cfg #0 CC). In UL-DL Cfg #0 in which the number of UL SFs is greater than the number of DL SFs, unlike the other UL-DL Cfgs, for a UL grant DCI format, a UL index indicating a UL SF to be scheduled is signaled (instead of a UL DAI). That is, the UL grant DCI format selectively includes a DAI field and UL index field according to the UL-DL Cfg, and the DAI field and UL index field are defined as having the same size (e.g., 2 bits). Here, the UL index may be used to determine the index of a subframe used for PUSCH transmission. Furthermore, in a DL grant DCI format for the UL-DL Cfg #0 CC, it is defined that (a DL DAI field is present but) a DL DAI is not signaled. That is, although a DL field is present, a DL DAI field (value) is not used. The UL grant DCI format includes DCI format 0/4, and the DL grant DCI format includes DCI format 1/1A/1B/1D/2/2A/2B/2C/2D. The UL index is signaled in UL-DL Cfg #0 to perform UL scheduling/HARQ on a large number of UL SFs using a small number of DL SFs. In addition, since the number of UL SFs is greater than the number of DL SFs in UL-DL Cfg #0, each of the DL SFs can be linked to different UL SF (for A/N transmission) and thus DL DAI signaling may be omitted.

In CA of a plurality of CCs having different subframe configurations (e.g., CA of a plurality of CCs having different UL-DL Cfgs), if a CC having UL-DL Cfg #0 is present, a (HARQ timing) Ref-Cfg of the CC having UL-DL Cfg #0 may be configured as a UL-DL Cfg of another CC, or a third UL-DL Cfg (in this case, UL index signaling may not be necessary). In this regard, in view of A/N transmission, a plurality of DL SFs of the CC having UL-DL Cfg #0 may be linked to one UL SF of a PCC. Accordingly, if UL-DL Cfg #N (N: integer other than 0 (e.g., 1 to 6)) is configured as a Ref-Cfg for the CC having UL-DL Cfg #0, providing of DL/UL DAI signaling to a DL/UL grant DCI format for scheduling DL/UL data on the CC having UL-DL Cfg #0 may be more efficient for A/N transmission.

Initially, the present invention proposes a DAI signaling scheme using a DCI format for scheduling a CC having UL-DL Cfg #0 (i.e., CC operating with UL-DL Cfg #0) in TDD (hereinafter referred to as a UL-DL Cfg #0 scheduling DCI format), and an A/N transmission method thereof. As one scheme, a case in which DL DAI signaling is activated in a UL-DL Cfg #0 scheduling DL grant DCI format may include (i) a case in which a UE is capable of performing CA, (ii) a case in which a plurality of CCs are assigned for a UE, (iii) a case in which a plurality of CCs having different UL-DL Cfgs are assigned for a UE, (iv) a case in which PUCCH format 3 is configured for A/N transmission, and a combination thereof. This is because, when PUCCH format 3 is configured, PUCCH format determination, A/N transmission on a PUSCH, simultaneous transmission of CSI or SR and A/N, etc. is performed depending on a DL DAI.

As another scheme, only when PUCCH format 3 is configured for A/N transmission (i) in CA of one or more CCs having UL-DL Cfg #0, (ii) by a UE capable of performing CA (of CCs having a UL-DL Cfg (#0)), and/or (iii) in CA of one or more CCs (having a UL-DL Cfg (#0)), it may be assumed that a DL DAI of a DL grant PDCCH for scheduling a corresponding CC corresponds to a DL DAI initial value (e.g., 1) while DL DAI signaling is not activated as in a conventional case. This is because the use of a TPC field in the DL grant PDCCH (e.g., PUCCH power control or A/N resource indication) and determination of a PUCCH format for A/N transmission, an A/N payload configuration for A/N transmission on a PUSCH, simultaneous transmission of CSI or SR and A/N, etc. are all determined according to value of the DL DAI (or, whether value of the DL DAI corresponds to the DL DAI initial value). Accordingly, when a DL grant PDCCH for scheduling an arbitrary CC is received, a UE corresponding to the above condition may regard that the DL DAI initial value for the corresponding CC is received, and perform TPC field reference, PUCCH power control, A/N resource determination, A/N payload configuration, simultaneous transmission of CSI or SR and A/N, etc.

Meanwhile, a case in which UL DAI signaling is activated in a UL-DL Cfg #0 scheduling UL grant DCI format may be restricted to CA of a plurality of CCs having different UL-DL Cfgs (excluding a case in which UL index signaling is inevitable).

Furthermore, in CA of a plurality of CCs having different UL-DL Cfgs, whether a DCI format supports DL DAI, UL DAI signaling may be determined according to TDD CA combination/structure, whether cross-carrier scheduling is configured, A/N timing Ref-Cfg, UL grant/PHICH timing Ref-Cfg, etc.

The present invention now proposes a method of determining whether DL/UL DAI signaling is supported, and a method of configuring A/N payload to be transmitted on a PUSCH (or PUCCH). The following description assumes for convenience that one PCC (or MCC) and one SCC having different UL-DL Cfgs are aggregated, and may be extended to a case in which a plurality of CCs having different subframe configurations are aggregated. Furthermore, in the following description, a DL grant DCI format includes those of a PDCCH for scheduling DL data, and a PDCCH for commanding SPS release. DL data (or DL signal) collectively refers to a PDCCH and PDSCH which require ACK/NACK feedback, and includes a PDCCH for instructing SPS release. A DL SF may include not only a general DL SF but also a special SF. In addition, a DCI format for scheduling a CC having UL-DL Cfg #0 (i.e., CC having or operating with UL-DL Cfg #0) is referred to as a UL-DL Cfg #0 scheduling DCI format.

<DL DAI Signaling>
(1) Method D-1: No DL DAI Signaling is Provided Using a (UL-DL Cfg #0 Scheduling) DL Grant DCI Format The size of A/N payload of a CC operating with UL-DL Cfg #0 may always be determined as a maximum size irrespective of an A/N transmission channel (e.g., PUCCH or PUSCH) (and irrespective of the value of UL DAI or whether the UL DAI is present). Here, the maximum size may correspond to a total number of DL SFs of UL-DL Cfg #0 linked to one PCC UL SF in view of A/N transmission. The corresponding A/N payload of UL-DL Cfg #0 may be ordered in the order of DL SFs instead of the order of DL DAIs. Meanwhile, this method may be applied only to a case in which the PCC has UL-DL Cfg #0 (i.e., case in which an A/N timing Ref-Cfg of the PCC is set to a PCC UL-DL Cfg). The Ref-Cfg of the PCC follows the UL-DL Cfg of the PCC. Furthermore, this method may be applied only to a CC which operates with UL-DL Cfg #0 and of which an A/N timing Ref-Cfg is set to UL-DL Cfg #0. In addition, this method may be applied to a CC of which an A/N timing Ref-Cfg is set to UL-DL Cfg #0, irrespective of UL-DL Cfgs. For example, if a CC has one of UL-DL Cfgs #0 to #6 (particularly, one of UL-DL Cfgs #1 to #6) and an A/N timing Ref-Cfg of the CC is set to UL-DL Cfg #0, no DAI signaling is provided using a DL grant DCI format for the CC. In this case, the proposed A/N payload configuration and A/N ordering scheme may be equally applied.

(2) Method D-2: DL DAI Signaling is Provided Using a (UL-DL Cfg #0 Scheduling) DL Grant DCI Format This method may be applied only to a case in which an SCC has UL-DL Cfg #0 (i.e., case in which an A/N timing Ref-Cfg of an SCC is set to a PCC UL-DL Cfg). Furthermore, this method may be applied only to a CC which operates with UL-DL Cfg #0 (hereinafter referred to as a UL-DL Cfg #0 CC) and of which an A/N timing Ref-Cfg is set to a UL-DL Cfg other than UL-DL Cfg #0. In addition, this method may be applied to a CC of which an A/N timing Ref-Cfg is set to a UL-DL Cfg other than UL-DL Cfg #0, irrespective of UL-DL Cfgs. For example, if a CC has one of UL-DL Cfgs #0 to #6 (particularly, UL-DL Cfg #0) and an A/N timing Ref-Cfg of the CC is set to one of UL-DL Cfgs #1 to #6, DAI signaling may be provided using a DL grant DCI format of the CC.

Meanwhile, in a PCC having UL-DL Cfg #0, an A/N timing Ref-Cfg of each CC may be determined as described below according to whether cross-carrier scheduling is configured. Here, cross-carrier scheduling may refer to scheduling of DL data to be transmitted in an SCC, by a PCC.

Case #1: (PCC, SCC)=UL-DL Cfg (#0, #N); cross-carrier scheduling
A/N timing Ref-Cfg of PCC: UL-DL Cfg #0 (i.e., PCC UL-DL Cfg)
A/N timing Ref-Cfg of SCC: UL-DL Cfg #0 (i.e., PCC UL-DL Cfg)
Case #2: (PCC, SCC)=UL-DL Cfg (#0, #N); non-cross-carrier scheduling
A/N timing Ref-Cfg of PCC: UL-DL Cfg #0 (i.e., PCC UL-DL Cfg)
A/N timing Ref-Cfg of SCC: UL-DL Cfg #N (i.e., SCC UL-DL Cfg)

Here, Case #1 may be generalized to a case in which both CC1 and CC2 have an A/N timing Ref-Cfg set to UL-DL Cfg #0. Furthermore, Case #2 may be generalized to a case in which CC1 and CC2 respectively have an A/N timing Ref-Cfg set to UL-DL Cfg #0 and an A/N timing Ref-Cfg set to UL-DL Cfg #N (N≥1). CC1 may be a PCC and CC2 may be an SCC. In the following description, the PCC and SCC may be respectively interchangeable with CC1 and CC2.

The present invention proposes the following schemes in Case #1 and Case #2. For convenience, activation/deactivation of DL DAI signaling is referred to as DL DAI ON/OFF. Here, DL DAI ON indicates that the value of a DL DAI field in a DCI format is usable in an A/N transmission procedure, and DL DAI OFF indicates that a DL DAI field is not included in a DCI format, or a DL DAI field is present but the value of the DL DAI field is not usable in an A/N transmission procedure.

Sol-1: DL DAI OFF for PCC, DL DAI ON for SCC
A UE may operate by assuming/regarding that all DL grant PDCCHs for scheduling a PCC and/or DL data correspond to the first DL SF or a DL DAI initial value (e.g., 1). Alternatively, the A/N payload (i.e., maximum size) and A/N ordering (i.e., DL SF order) scheme of Method D-1 may be applied to a PCC and SCC (irrespective of a transmission channel, e.g., PUCCH or PUSCH, and irrespective of the value of UL DAI/whether the UL DAI is present).

Sol-2: DL DAI OFF for both PCC and SCC
A UE may operate by assuming/regarding that all DL grant PDCCHs for scheduling a PCC and SCC and/or DL data correspond to the first DL SF or a DL DAI initial value (e.g., 1). Alternatively, the A/N payload (i.e., maximum size) and A/N ordering (i.e., DL SF order) scheme of Method D-1 may be applied to a PCC and SCC (irrespective of a transmission channel, e.g., PUCCH or PUSCH, and irrespective of the value of UL DAI/whether the UL DAI is present).

Sol-3: DL DAI ON for both PCC and SCC
An operation may not be separately defined as in Sol-1 and Sol-2. As a result, DL DAI signaling may always be activated irrespective of an A/N timing Ref-Cfg (whether it corresponds to UL-DL Cfg #0).

Meanwhile, the scheme may be applied to Case #1 and Case #2 (e.g., Sol-2 or Sol-3 may be commonly applied to Case #1 and Case #2), or different schemes may be applied to Case #1 and Case #2 (e.g., Sol-2 may be applied to Case #1, and Sol-1 or Sol-3 may be applied to Case #2).

Alternatively, Sol-2 may be applied if every CC has an A/N timing Ref-Cfg configured as UL-DL Cfg #0, and Sol-1 or Sol-3 may be applied if there is a CC having an A/N timing Ref-Cfg not configured as UL-DL Cfg #0. Otherwise, Sol-3 may be applied if every CC has an A/N timing Ref-Cfg not configured as UL-DL Cfg #0, and Sol-1 or Sol-2 may be applied if there is a CC having an A/N timing Ref-Cfg configured as UL-DL Cfg #0.

Meanwhile, the above-described schemes (e.g., Sol-1 to Sol-3) may be applied only when "PUCCH format 1b with channel selection" is set for A/N transmission.

Figure 19:
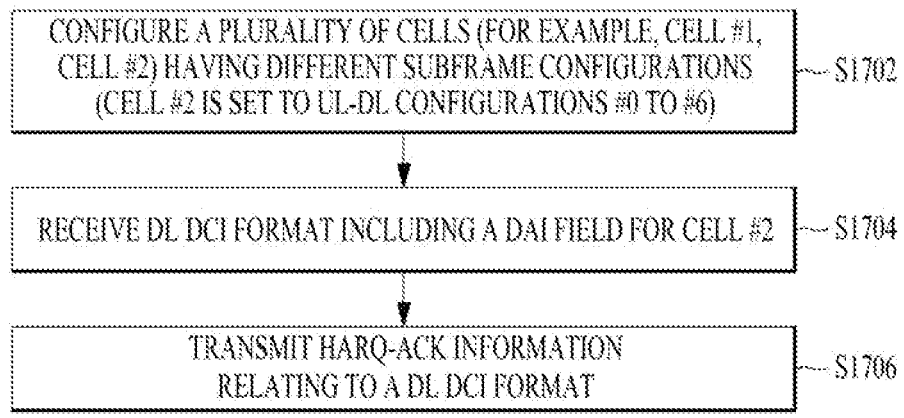
FIG. 19 illustrates a control information transmission procedure according to an embodiment of the present invention.

FIG. 19 illustrates a control information transmission procedure according to an embodiment of the present invention. This embodiment shows combination [Method D-1, Method D-2], and other combinations may be performed similarly. For example, this embodiment may be performed similarly on combination [Method D-1/D-2, Case#1, Sol-2].

Referring to FIG. 19, a plurality of cells (e.g., cell#1 and cell#2) having different subframe configurations may be configured for a UE (S1702). Here, cell#2 may have one of UL-DL Cfgs #0 to #6 (particularly, one of UL-DL Cfgs #1 to #6). Although cell types are not restrictive, cell#1 may be a PCell and cell#2 may be a SCell. After that, the UE may receive a DL DCI format including a DAI field, for cell#2 (S1704). Since cross-carrier scheduling is configured in Case#1, the DL DCI format may further include a CIF field. The DL DCI format includes DCI format 1/1A/1B/1C/1D/2/2A/2B/2C/2D. After that, the UE may transmit HARQ-ACK information related to the DL DCI format in uplink (S1706). Here, the HARQ-ACK information may include at least one of acknowledgement information about a PDSCH signal indicated by the DL DCI format, and acknowledgement information about an SPS release PDCCH signal including the DL DCI format.

According to the present invention, for HARQ-ACK timing, if a reference UL-DL Cfg (Ref-Cfg) applied to cell#2 is not UL-DL Cfg #0 (Method D-2), a DAI field may be used in a procedure for transmitting HARQ-ACK information (e.g., DTX detection, HARQ-ACK payload generation, HARQ-ACK resource allocation, etc.) (Method D-2). On the other hand, for HARQ-ACK timing, if a Ref-Cfg applied to cell#2 is UL-DL Cfg #0 (Method D-1/Case#1), a DAI field is not used in a procedure for transmitting HARQ-ACK information (Sol-2). In this case, a HARQ-ACK payload size of a cell operating with UL-DL Cfg #0 may always be determined as a maximum size irrespective of a HARQ-ACK transmission channel (e.g., PUCCH or PUSCH) (and irrespective of the value of UL DAI/whether the UL DAI is present). Here, the maximum size may correspond to a total number of DL SFs of UL-DL Cfg #0 linked to one PCell UL SF in view of HARQ-ACK transmission (see Table 3). The HARQ-ACK payload of the cell operating with UL-DL Cfg #0 may be ordered in the order of DL SFs instead of the order of DL DAIs.

<UL DAI Signaling>

(1) Method U-1: No UL DAI Signaling is Provided Using a UL-DL Cfg #0 Scheduling UL Grant DCI Format According to this method, a UL index may be signaled instead of a UL DAI with respect to the same field in a DCI format. Furthermore, the size of A/N payload of each CC having UL-DL Cfg #0 when A/N is transmitted on a PUSCH of the CC may be determined as a maximum size. Here, the maximum size may correspond to a total number of DL SFs of each CC linked to one PCC UL SF in view of A/N transmission (see Table 3). Specifically, A/N payload of a CC for providing DL DAI signaling may be ordered in the order of DL DAIs and A/N payload of a CC for not providing DL DAI signaling may be ordered in the order of DL SFs, or A/N payload of all CCs may be ordered in the order of DL SFs.

Meanwhile, this method may be applied only to (i) a case in which an MCC has UL-DL Cfg #0 (a UL grant/PHICH timing Ref-Cfg of an MCC is set to an MCC UL-DL Cfg), (ii) a case in which an SCC has UL-DL Cfg #0 and non-cross-carrier scheduling is configured, and (iii) a case in which an SCC has UL-DL Cfg #0 and cross-carrier scheduling and FD-TDD CA are configured (a UL grant/PHICH timing Ref-Cfg of an SCC is set to an SCC UL-DL Cfg). Furthermore, this method may be applied only to a CC which operates with UL-DL Cfg #0 (hereinafter referred to as a UL-DL Cfg #0 CC) and of which a UL grant/PHICH timing Ref-Cfg is set to UL-DL Cfg #0. In addition, this method may be applied to a CC of which a UL grant/PHICH timing Ref-Cfg is set to UL-DL Cfg #0, irrespective of UL-DL Cfgs. For example, if a CC has one of UL-DL Cfgs #0 to #6 (particularly, one of UL-DL Cfgs #1 to #6) and a UL grant/PHICH timing Ref-Cfg of the CC is set to UL-DL Cfg #0, no UL DAI signaling may be provided using a UL grant DCI format of the CC. (Instead, UL index signaling may be provided according to a conventional scheme). In this case, the proposed A/N payload configuration and A/N ordering scheme may be equally applied.

(2) Method U-2: UL DAI Signaling is Provided Using a UL-DL Cfg #0 Scheduling UL Grant DCI Format According to this method, a UL DAI may be signaled instead of a UL index with respect to the same field in a DCI format. Although applicable cases are not restrictive, this method may be applied only to a case in which an SCC has UL-DL Cfg #0 and cross-CC scheduling and HD-TDD CA are configured (a case in which a UL grant/PHICH timing Ref-Cfg of an SCC is set to an MCC UL-DL Cfg). That is, in other cases, no UL DAI signaling is provided using a UL-DL Cfg #0 scheduling UL grant DCI format. In this case, a UL index may be signaled using the UL-DL Cfg #0 scheduling UL grant DCI format as in a conventional case. Furthermore, this method may be applied only to a CC which operates with UL-DL Cfg #0 (i.e., UL-DL Cfg #0 CC) and of which a UL grant/PHICH timing Ref-Cfg is set to a UL-DL Cfg other than UL-DL Cfg #0. That is, if the UL grant/PHICH timing Ref-Cfg of the UL-DL Cfg #0 CC is set to UL-DL Cfg #0, no UL DAI signaling is provided using a UL-DL Cfg #0 scheduling UL grant DCI format. In this case, a UL index may be signaled using the UL-DL Cfg #0 scheduling UL grant DCI format as in a conventional case. A UL DAI and UL index may be signaled in the same field (e.g., 2-bit field) of a UL DCI format. In addition, this method may be applied to a CC of which a UL grant/PHICH timing Ref-Cfg is set to a UL-DL Cfg other than UL-DL Cfg #0, irrespective of UL-DL Cfgs. For example, if a CC has one of UL-DL Cfgs #0 to #6 (particularly, UL-DL Cfg #0) and a UL grant/PHICH timing Ref-Cfg of the CC is set to one of UL-DL Cfgs #1 to #6, no UL DAI signaling may be provided using a UL grant DCI format of the CC.

The methods proposed above in relation to DL/UL DAI signaling may be combined according to TDD CA combination/structure, whether cross-CC scheduling is configured, A/N timing Ref-Cfg, UL grant/PHICH timing Ref-Cfg, etc. For example, if an SCC has UL-DL Cfg #0 and non-cross-CC scheduling is configured, Method D-2 may be applied to DL DAI signaling, and Method U-1 may be applied to UL DAI signaling. As a result, a DL DAI may be signaled in a UL-DL Cfg #0 scheduling DL grant DCI format, and a UL DAI may not be signaled (instead of signaling a UL index) in a UL-DL Cfg #0 scheduling UL grant DCI format.

Meanwhile, in CA of a plurality of CCs having different UL-DL Cfgs (irrespective of UL-DL Cfgs), an SCC may be set to a UL SF at specific SF timing when a PCC is set to a DL SF and, more particularly, the SF may not be set to A/N timing. In this case, since there is no A/N to be transmitted at the SF timing, no UL DAI signaling may be needed by a UL grant DCI format for scheduling UL data to be transmitted at the SF timing. The present invention proposes to use a UL DAI field in the UL grant DCI format for scheduling the specific SF, for another purpose as described below. Here, the specific SF may be generalized to SF timing set to a UL SF but not set to A/N timing with respect to an arbitrary CC. Alternatively, (in a more generalized manner,) the proposed scheme may be applied to all SF timings irrespective of A/N timing or to a few designated SF timings (by using a UL DAI field, or adding a new field).

1) The UL DAI field is used to signal simultaneous transmission of a PUSCH and (periodic) CSI (e.g., PUSCH rate-matching with CSI piggyback, or no PUSCH rate-matching with CSI dropping), or simultaneous transmission of a PUSCH and (periodic) SRS (e.g., PUSCH rate-matching with SRS transmission, or no PUSCH rate-matching with SRS dropping) in the SF.

2) The UL DAI field is used to indicate a PUSCH to be transmitted (a CC for transmitting the PUSCH) after UCI (e.g., (periodic) CSI) other than A/N is piggybacked thereon.

Figure 20:
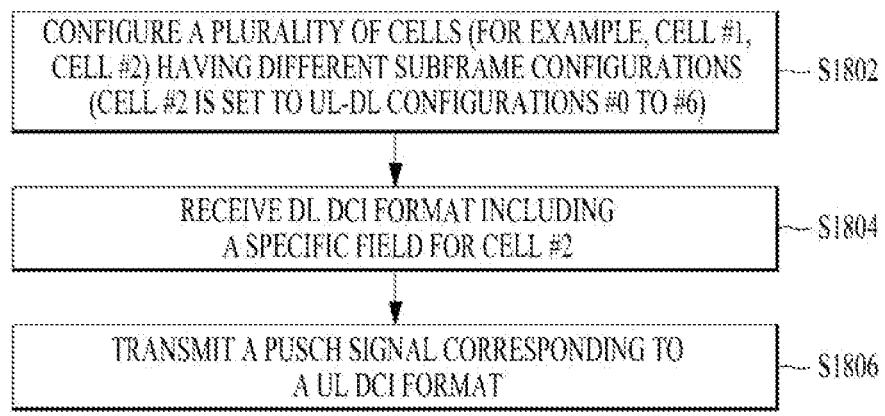
FIG. 20 illustrates a UL signal transmission procedure according to an embodiment of the present invention.

FIG. 20 illustrates a UL signal transmission procedure according to an embodiment of the present invention. This embodiment shows combination [Method U-1, Method U-2], and other combinations may be performed similarly.

Referring to FIG. 20, a plurality of cells (e.g., cell#1 and cell#2) having different subframe configurations may be configured for a UE (S1802). Here, cell#2 may have one of UL-DL Cfgs #0 to #6 (particularly, UL-DL Cfg #0). Although cell types are not restrictive, cell#1 may be a PCell and cell#2 may be a SCell. After that, the UE may receive a UL DCI format including a specific field (e.g., 2-bit field), for cell#2 (S1804). If cross-carrier scheduling is configured, the UL DCI format may further include a CIF field. The UL DCI format includes DCI format 0/4. After that, the UE may transmit a PUSCH signal corresponding to/indicated by the UL DCI format (S1806). Here, the PUSCH signal may include HARQ-ACK information. The HARQ-ACK information may include acknowledgement information on a PDSCH signal and/or SPS release PDCCH signal.

According to the present invention, for UG/PHICH timing (here, PUSCH (transmission) timing), if a reference UL-DL Cfg (Ref-Cfg) applied to cell#2 is not one of UL-DL Cfgs #1 to #6 (i.e., UL-DL Cfg #0), a specific field in a UL DCI format may indicate information used to determine the index of a UL subframe for transmitting a PUSCH signal. That is, the specific field may indicate a UL index. In this case, a HARQ-ACK payload size of each cell may always be determined as a maximum size. Here, the maximum size may correspond to a total number of DL SFs of each cell linked to one PCell UL SF in view of HARQ-ACK transmission (see Table 3). Specifically, HARQ-ACK payload of a cell for providing DL DAI signaling may be ordered in the order of DL DAIs and HARQ-ACK payload of a cell for not providing DL DAI signaling may be ordered in the order of DL SFs, or HARQ-ACK payload of all CCs may be ordered in the order of DL SFs. On the other hand, for UG/PHICH timing (here, PUSCH (transmission) timing), if a Ref-Cfg applied to cell#2 is one of UL-DL Cfgs #1 to #6, a specific field in a UL DCI format may indicate a DAI value (i.e., UL DAI value). The UL DAI value of a DAI field may be used in a procedure for transmitting HARQ-ACK information (e.g., DTX detection, HARQ-ACK payload generation, etc.).

Figure 21:
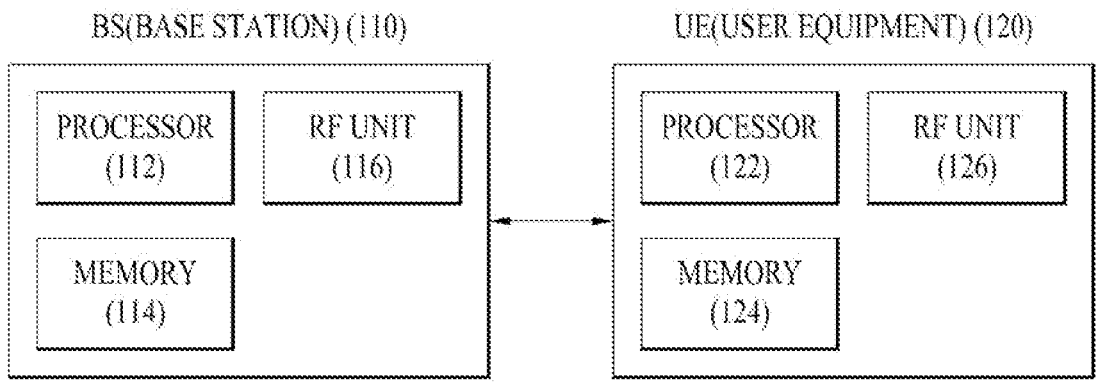
FIG. 21 illustrates a base station (BS) and a user equipment (UE) applicable to an embodiment of the present invention.

FIG. 21 illustrates a BS 110 and a UE 120 applicable to an embodiment of the present invention. In a system including a relay, the BS 110 and the UE 120 may be replaced with the relay.

Referring to FIG. 21, a wireless communication system includes the BS 110 and the UE 120. The BS 110 includes a processor 112, a memory 114, and a radio frequency (RF) unit 116. The processor 112 may be configured to implement the procedures and/or methods proposed by the present invention. The memory 114 is connected to the processor 112 and stores various types of information related to operation of the processor 112. The RF unit 116 is connected to the processor 112 and transmits and/or receives radio signals. The UE 120 includes a processor 122, a memory 124, and an RF unit 126. The processor 122 may be configured to implement the procedures and/or methods proposed by the present invention. The memory 124 is connected to the processor 122 and stores various types of information related to operation of the processor 122. The RF unit 126 is connected to the processor 122 and transmits and/or receives radio signals. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining some elements and/or features. Operation orders described in embodiments of the present invention may be rearranged. Some configurations or features of any one embodiment may be included in another embodiment and replaced with corresponding configurations or features of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship between a BS and a UE. In some cases, a specific operation described as performed by the BS may be performed by an upper node of the BS. Namely, it is apparent that, in a network composed of a plurality of network nodes including a BS, various operations performed for communication with a UE may be performed by the BS, or network nodes other than the BS. The term 'BS' may be replaced with the term 'fixed station', 'Node B', 'evolved Node B (eNode B, eNB)', 'access point', etc. The term 'UE' may be replaced with the term 'mobile station (MS)', 'mobile subscriber station (MSS)', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, a BS, or another device (e.g., relay) of a wireless communication system. Specifically, the present invention is applicable to a method and apparatus for transmitting control information.

The invention claimed is:
1. A method for transmitting control information by a user equipment (UE) in a carrier aggregation (CA)-based wireless communication system, the UE configured with a first cell set to one of uplink-downlink (UL-DL) configurations #0 to #6 and a second cell set to another of UL-DL configurations #0 to #6, the method comprising:
  receiving a downlink control information (DCI) having a DL DCI format comprising a downlink assignment index (DAI) field, for the second cell; and transmitting hybrid automatic repeat request (HARQ)-acknowledgement (ACK) information related to the DCI,
wherein, for HARQ-ACK timing, if a reference UL-DL configuration applied to the second cell is one of UL-DL configurations #1 to #6, the DAI field is used in a procedure for transmitting the HARQ-ACK information,
wherein, for HARQ-ACK timing, if a reference UL-DL configuration applied to the second cell is UL-DL configuration #0, the DAI field is not used in a procedure for transmitting the HARQ-ACK information, and
wherein subframe configurations according to the UL-DL configurations #0 to #6 are given as shown in the following table:

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where, D denotes a DL subframe, U denotes a UL subframe, and S denotes a special subframe.

2. The method according to claim 1, wherein the first cell is set to UL-DL configuration #0, and the second cell is set to one of UL-DL configurations #1 to #6.

3. The method according to claim 2, wherein the first cell is a primary cell (PCell), and the second cell is a secondary cell (SCell).

4. The method according to claim 3, wherein the DL DCI format further comprises a carrier indicator field (CIF).

5. The method according to claim 4, wherein the DL DCI format comprises DCI format 1, 1A, 1B, 1C, 1D, 2, 2A, 2B, 2C, or 2D.

6. The method according to claim 1, wherein the HARQ-ACK information comprises at least one of
acknowledgement information about a physical downlink shared channel (PDSCH) signal indicated by the DCI, or
acknowledgement information about a physical downlink control channel (PDCCH) signal comprising the DCI and indicating semi-persistent scheduling (SPS) release.

7. A user equipment (UE) used in a carrier aggregation (CA)-based wireless communication system, the UE configured with a first cell set to one of uplink-downlink (UL-DL) configurations #0 to #6 and a second cell set to another of UL-DL configurations #0 to #6, the UE comprising:
a radio frequency (RF) unit; and
a processor,
wherein the processor is configured to:
receive a downlink control information (DCI) format comprising a downlink assignment index (DAI) field, for the second cell; and
transmit hybrid automatic repeat request (HARQ)-acknowledgement (ACK) information related to the DCI,
wherein, for HARQ-ACK timing, if a reference UL-DL configuration applied to the second cell is one of UL-DL configurations #1 to #6, the DAI field is used in a procedure for transmitting the HARQ-ACK information,
wherein, for HARQ-ACK timing, if a reference UL-DL configuration applied to the second cell is UL-DL configuration #0, the DAI field is not used in a procedure for transmitting the HARQ-ACK information, and
wherein subframe configurations according to the UL-DL configurations are given as shown in the following table:

| UL-DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where, D denotes a DL subframe, U denotes a UL subframe, and S denotes a special subframe.

8. The UE according to claim 7, wherein the first cell is set to UL-DL configuration #0, and the second cell is set to one of UL-DL configurations #1 to #6.

9. The UE according to claim 8, wherein the first cell is a primary cell (PCell), and the second cell is a secondary cell (SCell).

10. The UE according to claim 9, wherein the DL DCI format further comprises a carrier indicator field (CIF).

11. The UE according to claim 10, wherein the DL DCI format comprises DCI format 1, 1A, 1B, 1C, 1D, 2, 2A, 2B, 2C, or 2D.

12. The UE according to claim 7, wherein the HARQ-ACK information comprises at least one of
acknowledgement information about a physical downlink shared channel (PDSCH) signal indicated by the DCI, or
acknowledgement information about a physical downlink control channel (PDCCH) signal comprising the DCI and indicating semi-persistent scheduling (SPS) release.

* * * * *